United States Patent
Ono et al.

(10) Patent No.: US 8,370,025 B2
(45) Date of Patent: Feb. 5, 2013

(54) STEERING APPARATUS, STEERING METHOD, AND COMPUTER READABLE STORAGE MEDIUM

(75) Inventors: Eiichi Ono, Toyota (JP); Yuji Muragishi, Owariasahi (JP); Daisuke Yamada, Nagoya (JP); Shinsuke Sato, Toyota (JP)

(73) Assignee: Kabushiki Kaisha Toyota Chuo Kenkyusho, Aichi (JP)

( * ) Notice: Subject to any disclaimer, the term of this patent is extended or adjusted under 35 U.S.C. 154(b) by 0 days.

(21) Appl. No.: 13/420,154

(22) Filed: Mar. 14, 2012

(65) Prior Publication Data
US 2012/0245797 A1 Sep. 27, 2012

(30) Foreign Application Priority Data
Mar. 25, 2011 (JP) ................................ 2011-068691

(51) Int. Cl.
*G06F 19/00* (2011.01)

(52) U.S. Cl. .................. 701/42; 701/1; 701/69; 701/38; 701/41; 701/48; 701/70; 701/72; 701/82; 180/197; 180/246; 180/402; 180/404; 180/405; 340/441; 303/140; 303/146; 303/147; 318/432

(58) Field of Classification Search ............ 701/29, 701/41, 42, 70, 1, 38, 48, 69, 72, 82; 180/197, 180/246, 402, 404, 405, 421, 422, 423, 443, 180/282, 408, 412, 413, 415, 445, 446; 340/441; 303/140, 146, 147; 280/5.51; 318/432
See application file for complete search history.

(56) References Cited

U.S. PATENT DOCUMENTS

| | | | | |
|---|---|---|---|---|
| 4,971,173 A | * | 11/1990 | Takahashi | 180/412 |
| 5,388,658 A | * | 2/1995 | Ando et al. | 180/197 |
| 5,481,457 A | * | 1/1996 | Yamamoto et al. | 701/41 |
| 5,528,497 A | * | 6/1996 | Yamamoto et al. | 701/41 |
| 5,636,121 A | * | 6/1997 | Tsuyama et al. | 701/70 |
| 6,691,818 B2 | * | 2/2004 | Endo et al. | 180/446 |

(Continued)

FOREIGN PATENT DOCUMENTS

| | | |
|---|---|---|
| JP | A-2010-170187 | 8/2010 |
| JP | A-2011-143821 | 7/2011 |

OTHER PUBLICATIONS

Yang et al., Multi-Mode Control Method Based on Fuzzy Selector in the Four Wheel Steering Control System, 2010, IEEE, p. 1221-1226.*

(Continued)

*Primary Examiner* — McDieunel Marc
(74) *Attorney, Agent, or Firm* — Oliff & Berridge, PLC

(57) ABSTRACT

A target value for yaw angle velocity gain is computed according to a map expressing a relationship between steering wheel angle and yaw angle velocity gain predetermined such that a direction as seen from a driver of a target destination point for vehicle travel at a predetermined time after a forward gaze and a direction as seen from the driver are caused to match each other, and a steering gear ratio is controlled accordingly. A target value for a steering wheel torque corresponding to the detected steering wheel angle and the acquired yaw angular velocity is set, based on a relationship between yaw angular velocity and resistance-feel level predetermined such that the resistance feel level for a driver monotonically increases with increasing yaw angular velocity. Control is then preformed so as to realize the steering wheel torque target value.

17 Claims, 19 Drawing Sheets

U.S. PATENT DOCUMENTS

| | | | |
|---|---|---|---|
| 7,302,328 B2 * | 11/2007 | Kato et al. | 701/41 |
| 7,664,584 B2 * | 2/2010 | Chino et al. | 701/41 |
| 7,698,035 B2 * | 4/2010 | Chino et al. | 701/41 |
| 8,224,526 B2 * | 7/2012 | Miyajima et al. | 701/41 |
| 2002/0043423 A1 * | 4/2002 | Endo et al. | 180/446 |
| 2002/0074183 A1 * | 6/2002 | Takai et al. | 180/421 |
| 2003/0060955 A1 * | 3/2003 | Suissa | 701/41 |
| 2009/0240389 A1 * | 9/2009 | Nomura et al. | 701/29 |
| 2010/0168963 A1 * | 7/2010 | Yamamoto | 701/42 |

OTHER PUBLICATIONS

Shufeng et al., Performance Analysis of 4WS Vehicle Based on Different Control Strategy, 2009, IEEE, p. 5401-5404.*

Lam et al., Omnidirectional Steering Interface and Control for a Four-Wheel Independent Steering Vehicle, 2010, IEEE, p. 329-338.*

Chong et al., Torque Steering Control of 4-Wheel Drive Electric Vehicle, 1996, IEEE, p. 159-164.*

Shimizu, Yasuo et al., "Effects and Design of Steering System with Variable Gear-ratio according to Vehicle Speed and Steering Wheel Angle," Technical Proceedings Pre-publication, 1999, No. 21-99, The Society of Automotive Engineers of Japan, pp. 9-12 (with Abstract).

U.S. Appl. No. 13/063,668, filed Mar. 11, 2011 in the name of Ono.

U.S. Appl. No. 13/496,767, filed Mar. 16, 2012 in the name of Ono.

* cited by examiner

FIG.3
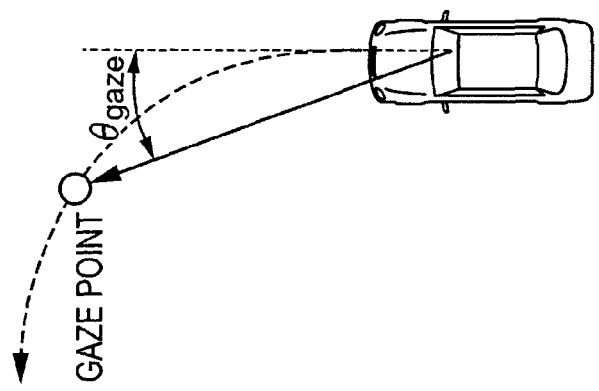
(2)
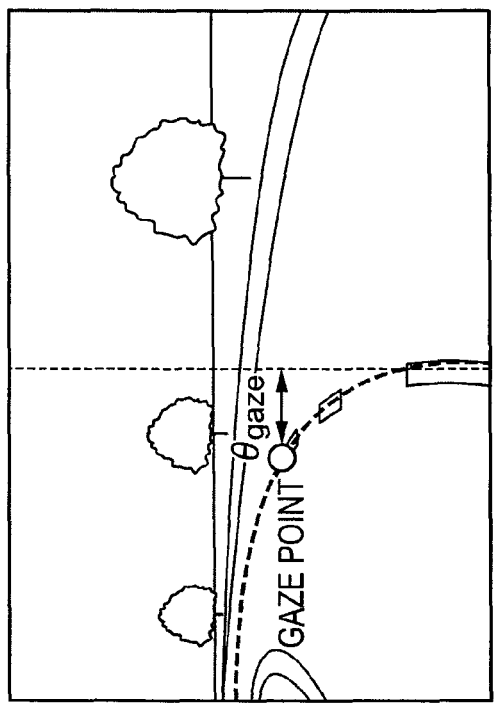
(1)

STEERING APPARATUS, STEERING METHOD, AND COMPUTER READABLE STORAGE MEDIUM

CROSS-REFERENCE TO RELATED APPLICATION

This application is based on and claims priority under 35 USC 119 from Japanese Patent Application No. 2011-068691 filed on Mar. 25, 2011, the disclosure of which is incorporated by reference herein.

BACKGROUND

1. Technical Field

The present invention relates to a steering apparatus, and in particular to a steering apparatus, a steering method and a computer readable storage medium for realizing a relationship between steering wheel angle and yaw angular velocity.

2. Related Art

In known technology (Technical Proceedings Pre-publication No. 21-99, 1999 "Effects and Design of Steering System with Variable Gear-ratio According to Vehicle Speed and Steering Wheel Angle" by Yasuo SHIMIZU and others, published by the Society of Automotive Engineers of Japan) a steering gear ratio is set such that the angle formed between the current vehicle traveling direction and a gaze point is proportional to the steering wheel angle, based on experimental data "when entering a corner, irrespective of the vehicle speed a driver gazes at a ground point on a target path which will be passed through after about 1.2 seconds".

However, the above Cited Reference only refers to "making the steering gear ratio proportional to", and there is no disclosure regarding specific setting methods such as proportional gain. There is therefore a problem with the technology described above that if the gear ratio is too small then the actual steering angle tends to become large too quickly with respect to the steering wheel angle, resulting in a driver feeling discomfort.

SUMMARY

The present invention is directed towards solving the above problem and an object of the present invention is to provide a steering apparatus, a steering method and a computer readable storage medium capable of performing steering such that a driver does not feel discomfort and steering matches driver sensation.

A steering apparatus according to a first aspect of the present invention is a steering apparatus for realizing a relationship between a steering wheel angle and a yaw angular velocity occurring in a vehicle, predetermined such that the direction as seen from the view point of a driver of a target destination point on a target course for vehicle travel at a predetermined time after a forward gaze and the direction as seen from the view point of the driver of a reference position on the steering wheel are corresponded with each other, wherein the steering apparatus is configured including: a physical turn amount acquisition section that acquires a physical turn amount of a vehicle; a steering angle detection section that detects the steering wheel angle existing due to driver steering; a target setting section that, based on a predetermined relationship between the physical turn amount and a resistance-feel level, sets a target value of steering wheel torque to correspond to the detected steering wheel angle and the acquired physical turn amount such that the resistance-feel level of the driver derived from a perceived amount of proportional change in steering wheel torque to a change in steering wheel angle and a perceived amount of the steering wheel torque monotonically increase with increase in physical turn amount; and a steering wheel torque controller that controls so as to realize the steering wheel torque target value set by the target setting section.

According to the steering apparatus of the present invention, due to realizing a predetermined relationship between the steering wheel angle and the yaw angular velocity occurring in the vehicle, the direction as seen from the view point of a driver of a target destination point on a target course for vehicle travel at a predetermined time after a forward gaze and the direction as seen from the view point of the driver of a reference position on the steering wheel are corresponded with each other.

A physical turn amount of a vehicle is acquired by the physical turn amount acquisition section, and the steering wheel angle existing due to driver steering is detected by the steering angle detection section. A target value is set by the target value setting section, based on the predetermined relationship between the physical turn amount and the resistance-feel level, for steering wheel torque to correspond to the detected steering wheel angle and the acquired physical turn amount such that the resistance-feel level of the driver derived from the perceived amount of proportional change in steering wheel torque to a change in steering wheel angle and the perceived amount of the steering wheel torque monotonically increase with increase in physical turn amount.

Then the steering wheel torque controller controls so as to realize the steering wheel torque target value set by the target setting section.

Steering can accordingly be performed such that a driver does not feel discomfort and steering matches driver sensation due to the direction as seen from the view point of a driver of a target destination point on a target course for vehicle travel at a predetermined time after a forward gaze and the direction as seen from the view point of the driver of a reference position on the steering wheel being corresponded with each other. The driver can also perform stable steering even when the physical turn amount increases due to the resistance-feel level of the driver increasing with increase in physical turn amount. The steering apparatus according to the present invention may realize a relationship between the steering wheel angle and the yaw angular velocity using the steering gear ratio of the vehicle.

The above forward gaze time may be a time from 2.5 seconds to 3.5 seconds.

The above relationship between the steering wheel angle and the yaw angular velocity may be determined so as to generate a yaw angular velocity proportional to a tangent to a relative angle between the steering wheel angle and a roll angle for generating in the vehicle.

The above physical turn amount may be taken as a yaw angular velocity or as a lateral acceleration.

The steering apparatus according to the present invention may further include a lever for operating braking in the vehicle provided to a grip section of the steering wheel. So doing enables braking operation to be performed with steering wheel operation alone.

The steering apparatus of the present invention may further include: a vehicle speed detection section for detecting vehicle speed of the vehicle; a yaw angular velocity gain computation section for computing a yaw angular velocity gain based on the vehicle speed detected by the vehicle speed detection section, the steering wheel angle detected by the steering wheel angle detection section and a relationship between the steering wheel angle and the yaw angular velocity predetermined for each vehicle speed; and a gear ratio controller for controlling a steering gear ratio so as to realize the yaw angular velocity gain computed by the yaw angular velocity gain computation section.

The above yaw angular velocity gain computation section may compute the yaw angular velocity gain based on the relationship between the steering wheel angle and the yaw angular velocity gain, predetermined from the vehicle speed detected by the vehicle speed detection section, the steering wheel angle detected by the steering wheel angle detection section, and the relationship between the steering wheel angle and the yaw angular velocity predetermined for each vehicle speed.

The steering apparatus of the present invention may further include: a vehicle speed detection section for detecting the vehicle speed of a vehicle; a yaw angular velocity computation section for computing a target yaw angular velocity based on a vehicle speed detected by the vehicle speed detection section, the steering wheel angle detected by the steering wheel angle detection section, and a predetermined relationship between the steering wheel angle and the yaw angular velocity for each vehicle speed; and a gear ratio controller for controlling a steering gear ratio so as to realize the target yaw angular velocity computed by the yaw angular velocity gain computation section.

The above target setting section may set as a target value the steering wheel torque corresponding to the detected steering wheel angle and the acquired physical turn amount acquired based on a predetermined relationship between the physical turn amount and the resistance-feel level and based on a correspondence relationship between the physical turn amount, the steering wheel angle and the steering wheel torque.

The above steering wheel torque controller may control such that a torque assistance level according to the steering wheel torque target value set by the target setting section or the target value of the steering wheel torque is generated.

A steering method of a first aspect of the present invention is a steering method for realizing a relationship between a steering wheel angle and a yaw angular velocity occurring in a vehicle, predetermined such that the direction as seen from the view point of a driver of a target destination point on a target course for vehicle travel at a predetermined time after a forward gaze and the direction as seen from the view point of the driver of a reference position on the steering wheel are corresponded with each other, wherein the steering method includes: acquiring a physical turn amount of a vehicle; detecting the steering wheel angle existing due to driver steering; setting, based on a predetermined relationship between the physical turn amount and a resistance-feel level, a target value of steering wheel torque to correspond to the detected steering wheel angle and the acquired physical turn amount such that the resistance-feel level of the driver derived based on a perceived amount of proportional change in steering wheel torque to a change in steering wheel angle and a perceived amount of the steering wheel torque monotonically increase with increase in physical turn amount; and controlling so as to realize the set steering wheel torque target value.

A non-transitory computer readable storage medium according to a first aspect of the present invention is stored with a program for causing a computer to execute steering control for realizing a relationship between a steering wheel angle and a yaw angular velocity occurring in a vehicle, predetermined such that the direction as seen from the view point of a driver of a target destination point on a target course for vehicle travel at a predetermined time after a forward gaze and the direction as seen from the view point of the driver of a reference position on the steering wheel are corresponded with each other, wherein the steering control includes: acquiring a physical turn amount of a vehicle; detecting the steering wheel angle existing due to driver steering; setting, based on a predetermined relationship between the physical turn amount and a resistance-feel level, a target value of steering wheel torque to correspond to the detected steering wheel angle and the acquired physical turn amount such that the resistance-feel level of the driver derived based on a perceived amount of proportional change in steering wheel torque to a change in steering wheel angle and a perceived amount of the steering wheel torque monotonically increase with increase in physical turn amount; and controlling so as to realize the set steering wheel torque target value.

As explained above, the steering apparatus thereby exhibits the advantageous effect of enabling steering to be performed such that a driver does not feel discomfort and enabling steering to be performed matching driver sensation due to being able to enhance the diver-vehicle togetherness by corresponding the direction as seen from the view point of the driver of the target destination point on the target course for vehicle travel at the predetermined time after a forward gaze with the direction as seen from the view point of the driver of the reference position on the steering wheel with each other.

BRIEF DESCRIPTION OF THE DRAWINGS

Exemplary embodiments of the present invention will be described in detail based on the following figures, wherein:

FIG. 3 illustrates an angle of deviation between a vehicle traveling direction and a direction towards a target destination point;

DETAILED DESCRIPTION

Detailed explanation follows regarding exemplary embodiments of the present invention, with reference to the drawings. In the present exemplary embodiment explanation is given of an example in which the present invention is applied to a vehicle steering apparatus for mounting to a vehicle to control a vehicle steering gear ratio.

Figure 1:
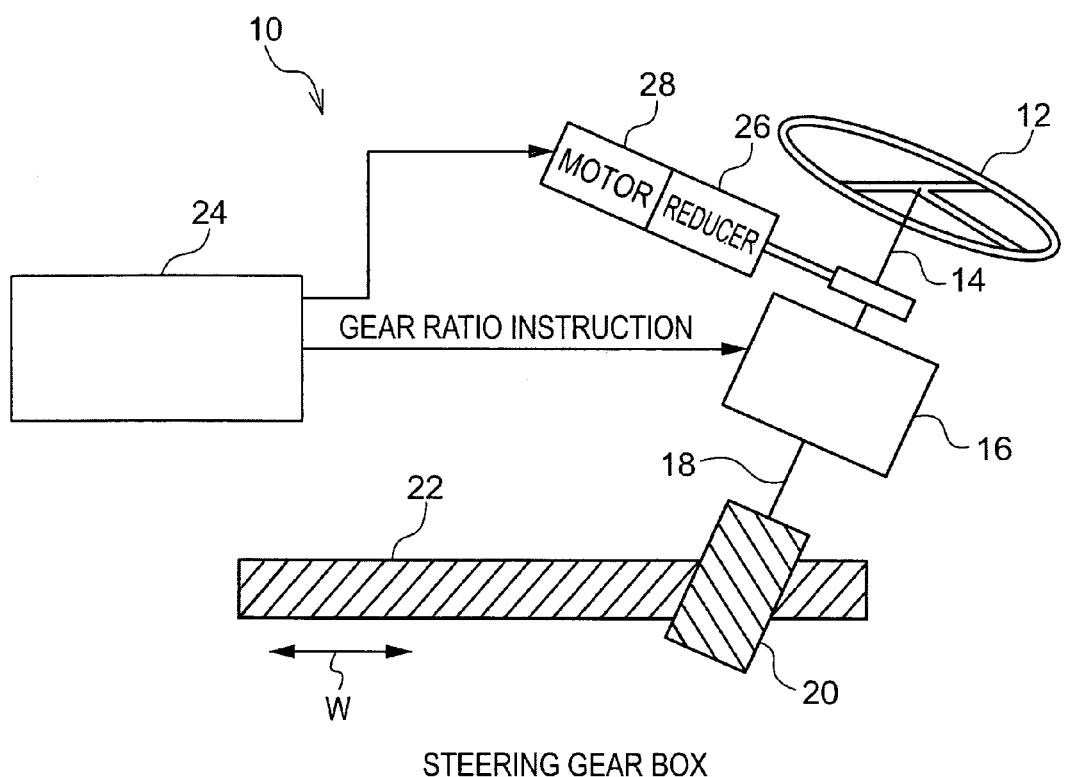
FIG. 1 is a schematic diagram illustrating a configuration of a vehicle steering apparatus according to a first exemplary embodiment of the present invention.

As shown in FIG. 1, a vehicle steering apparatus 10 according to an exemplary embodiment of the present invention includes a rotating shaft 14 interlocked to a steering wheel 12 and connected to a variable steering gear ratio mechanism 16. An output shaft 18 projects out from the variable steering gear ratio mechanism 16, and a pinion 20 coupled to the output shaft 18 meshes with a rack shaft 22 coupled to steerable wheels, not shown in the drawings.

Rotation of the steering wheel 12 is hence transmitted through the variable steering gear ratio mechanism 16 to the pinion 20 so as to move the rack shaft 22 along its axial direction (the arrow W direction of FIG. 1), thereby turning the steerable wheels.

The variable steering gear ratio mechanism 16 is coupled up to a computer 24. The variable steering gear ratio mechanism 16 is configured by any known structure. The variable steering gear ratio mechanism 16 is configured to change the steering gear ratio of the variable steering gear ratio mechanism 16 according to a gear ratio instruction signal output from the computer 24.

The vehicle steering apparatus 10 is also equipped with an electrically powered steering apparatus motor (steering actuator) 28 for outputting steering assistance torque for changing the set angle of the steerable wheels, such that the steering assistance torque is transmitted to the rotating shaft 14 through a reducer 26. The electrically powered steering apparatus motor 28 is connected to the computer 24.

Figure 2:
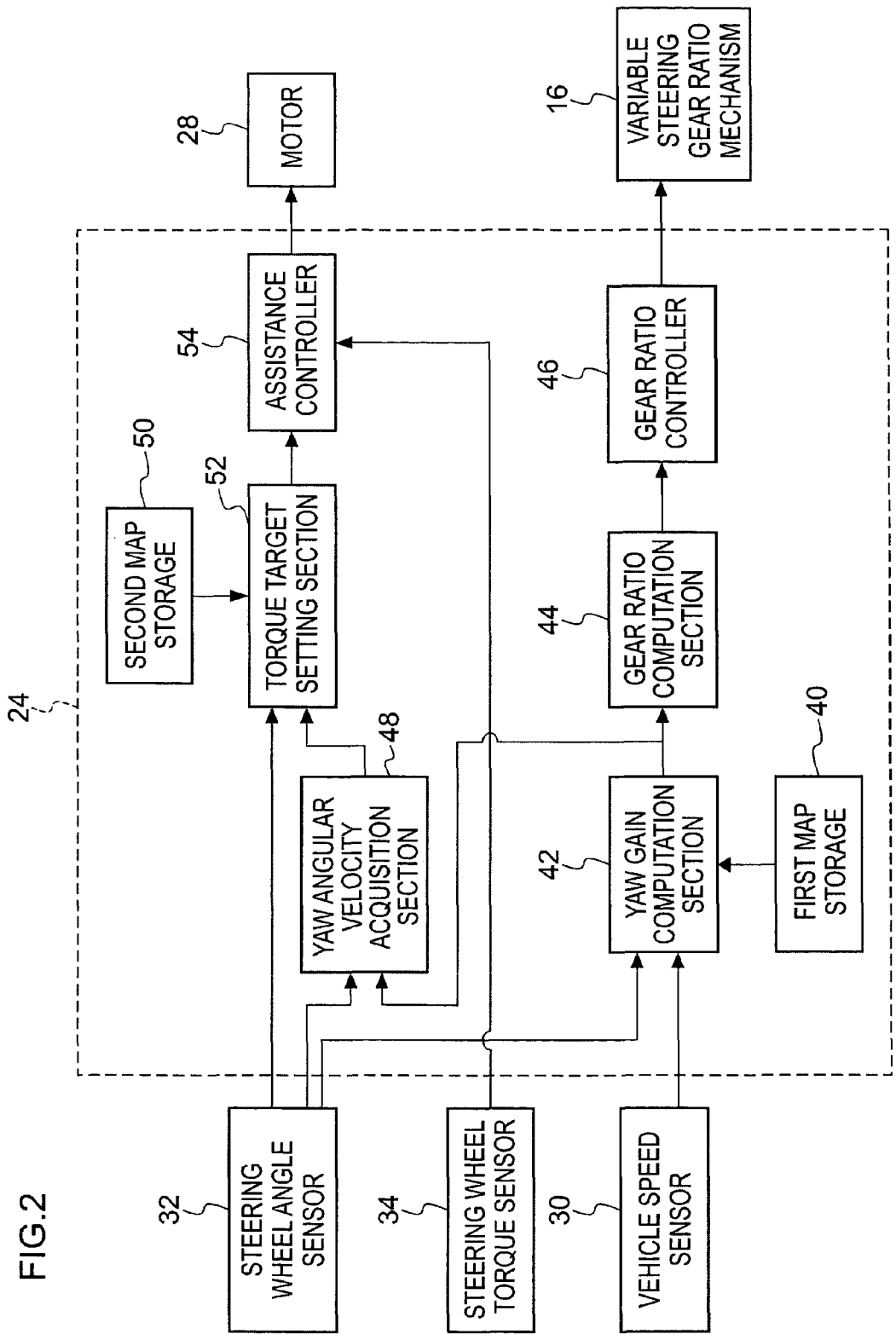
FIG. 2 is a block diagram illustrating a configuration of a computer of a vehicle steering apparatus according to the first exemplary embodiment of the present invention.

As shown in FIG. 2, the computer 24 is connected to a vehicle speed sensor 30 for detecting the speed of the vehicle to which it is installed, to a steering wheel angle sensor 32 for detecting the steering angle of the steering wheel 12 (the steering wheel angle), and to a steering wheel torque sensor 34 for detecting the torque of the steering wheel 12 (steering wheel torque).

The computer 24 includes a CPU, RAM, and ROM stored with a program for executing a characteristic computation routine, a torque control routine and a gear ratio control routine, described later. The computer 24 has a functional configuration as set out below. The computer 24 includes: a first map storage 40 pre-stored with a first map indicating relationships between steering angle of the steering wheel 12, vehicle speed and yaw angular velocity gain; a yaw gain computation section 42 for, based on the vehicle speed from the vehicle speed sensor 30 and the steering wheel angle from the steering wheel angle sensor 32, computing a target value of yaw angular velocity gain according to the first map stored in the first map storage 40; a gear ratio computation section 44 for computing a steering gear ratio for realizing the computed target value of yaw angular velocity gain; and a gear ratio controller 46 for outputting a gear ratio instruction signal so as to change to the computed steering gear ratio.

The computer 24 also includes: a yaw angular velocity acquisition section 48 that multiplies the computed yaw angular velocity gain by the steering wheel angle from the steering wheel angle sensor 32 to compute the yaw angular velocity; a second map storage 50 stored with a second map representing corresponding relationships between yaw angular velocity, steering wheel angle and steering wheel torque; a torque target setting section 52 that employs the second map to set a steering wheel torque according to the steering wheel angle from the steering wheel angle sensor 32 and the acquired yaw angular velocity; and an assistance controller 54 that controls operation of the electrically powered steering apparatus motor 28 based on the set steering wheel torque target value and the detected steering wheel torque. Note that the yaw angular velocity acquisition section 48 serves as an example of a physical turn amount acquisition section, the torque target setting section 52 serves as an example of a target setting section and the assistance controller 54 serves as an example of a steering wheel torque controller.

Explanation follows regarding the principles behind the present exemplary embodiment.

It is known from the description of a driver model in the specification of Japanese Patent Application No. 2010-170187 that the forward gaze angle, which is the angle of deviation between the vehicle progression direction and the direction of a target destination point on a target course for vehicle travel at a predetermined time after a forward gaze, and the yaw angular velocity after a specific duration have a proportional relationship to each other that is not dependent on the vehicle speed.

Namely, based on a deviation angle $\theta_{gaze}$ between the vehicle progression direction (speed vector direction) and the direction of a vehicle target destination point after a forward gaze time T (see FIG. 3(1) and FIG. 3(2)), a predicted value $r_{pre}$ of yaw angular velocity is computed according to Equation (1) below as a predicted vehicle motion value caused by driver steering wheel operation.

Equation (1)

$$r(t+\tau) = k_r \cdot \theta_{gaze}(t) \tag{1}$$

Wherein: $k_r$ is transmission gain from forward gaze angle $\theta_{gaze}$ to yaw angular velocity r, and $\tau$ is dead time. Dead time $\tau$ is the time taken to match the timing of a change in vehicle motion to the timing when the radius of curvature of the traveling course is changed, and the dead time τ is a predetermined duration.

Equation (1) above expresses the result of a driver performing steering wheel operation based on the forward gaze angle.

As a result of logical analysis it can be seen that the relationship shown in the following Equation (2) holds between forward gaze time $T_{gaze}$ and the transmission gain $k_r$ from forward gaze angle $\theta_{gaze}$ to yaw angular velocity r.

Equation (2)

$$k_r \cdot T_{gaze} = 2 \tag{2}$$

In the present exemplary embodiment forward gaze time $T_{gaze}$ is set as a fixed time between 2.5 seconds and 3.5 seconds.

It can be seen that the relationship in the following Equation (3) holds between the forward gaze time $T_{gaze}$ and the dead time τ.

Equation (3)

$$T_{gaze} = 3 \cdot \tau \tag{3}$$

Figure 4:
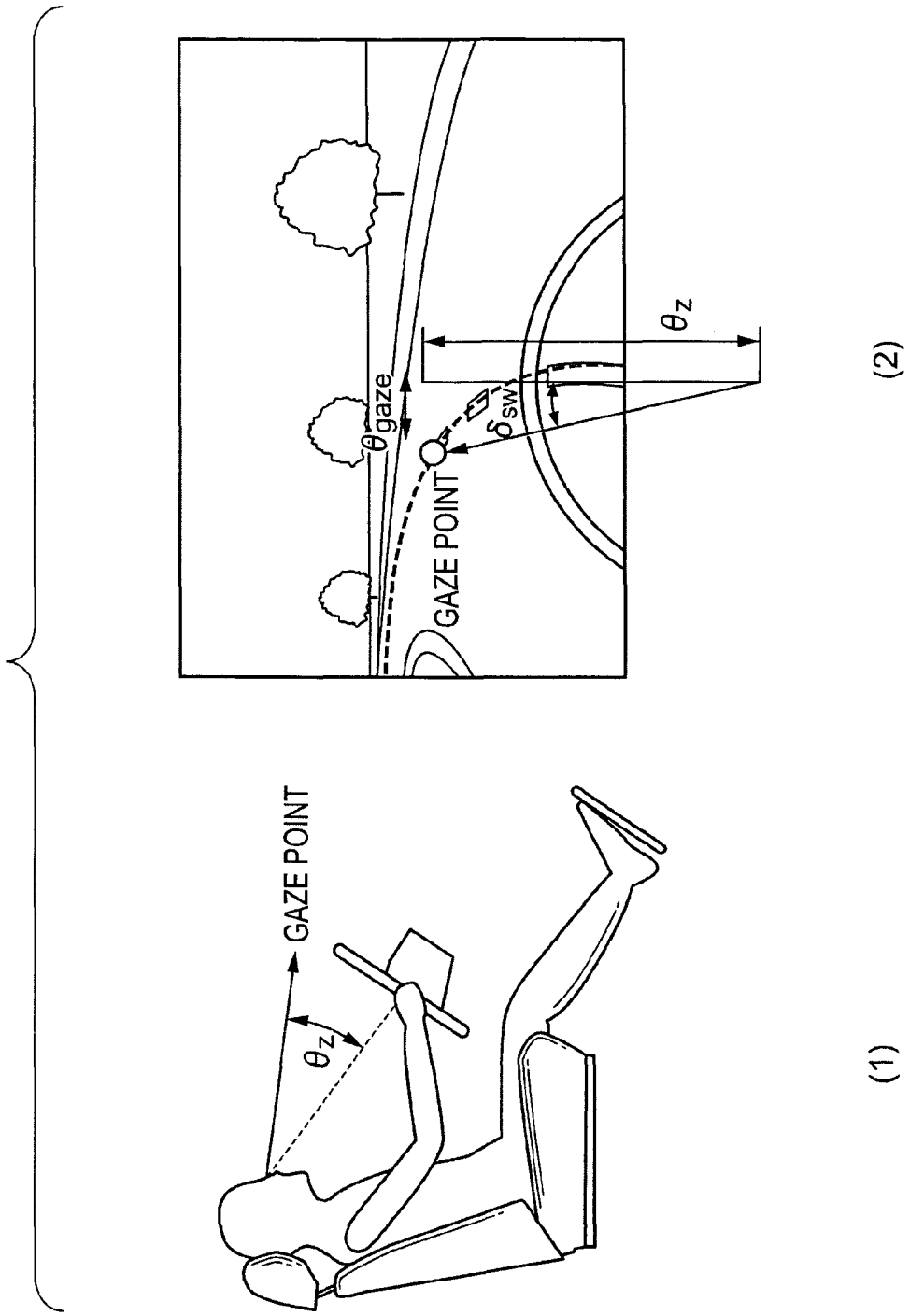
FIG. 4 shows an image (1) illustrating a relative depression angle, and an image (2) illustrating an angle of deviation between a vehicle front-rear direction and a direction towards a target destination point.

Operating the steering wheel based on the forward gaze angle shows that a driver intends to pass through this position after the forward gaze time. The present exemplary embodiment has noticed from this effect that such characteristics as the sensation of driver-vehicle togetherness, steering characteristics and agility are enhanced by making the direction of the forward gaze point indicating the output of vehicle motion and the direction of a reference position on the steering wheel indicating the amount of driver steering operation coincide with each other, as shown in FIG. 4(2).

However, since the forward gaze angle in FIG. 3(1) and FIG. 3(2) is defined with respect to the vehicle traveling direction, in order to match the relationship of the steering wheel angle it is necessary to take the vehicle front-rear direction of the seat in which the driver is seated as the reference. The present exemplary embodiment hence, as shown in the following Equation (4), employs the concept of making the following angles coincide with each other: the angle arrived at by adding the vehicle slip angle to the forward gaze angle (the angle of deviation between the vehicle front-rear direction and the direction of a target destination point on a target course for vehicle travel at a predetermined time after a forward gaze) and the steering wheel angle (the relative angle between a reference position when the steering wheel is in the neutral state and the current location of the steering wheel reference position).

Equation (4)

$$\theta_{gaze\beta} = \theta_{gaze} + \beta \tag{4}$$

As shown in FIG. 4(1), the following Equation (5) can be obtained wherein $\theta_z$ is the relative depression angle between the steering wheel center and the forward gaze point, and under conditions when the steering wheel angle $\delta_{SW}$ coincides with the direction of the gaze point.

Equation (5)

$$\tan(\delta_{sw} - K_{roll} \cdot r \cdot v) = \frac{\theta_{gaze\beta}}{\theta_z} = \frac{\theta_{gaze} + \beta}{\theta_z} \tag{5}$$

The above Equation (5) takes into consideration an apparent reduction of the roll angle in the steering wheel angle due to a roll motion occurring. $K_{roll}$ is the roll rate. Since the relationship of Equation (2) holds between the forward gaze time $T_{gaze}$ and the transmission gain $k_r$ from the forward gaze angle $\theta_{gaze}$ to the yaw angular velocity r, the forward gaze angle $\theta_{gaze}$ can be expressed by the following Equation (6) when taking a normal circular turning path.

Equation (6)

$$\theta_{gaze} = \frac{T_{gaze}}{2} \cdot r \tag{6}$$

Under linear vehicle motion modeling the vehicle slip angle β is expressed by the following Equation (7).

Equation (7)

$$\beta = \left( \frac{l_r}{v} - \frac{ml_r}{2lC_r} \cdot v \right) \cdot r \tag{7}$$

The following Equation (8) can be obtained by re-writing above Equation (5) using Equation (6) and Equation (7).

Equation (8)

$$\tan(\delta_{sw} - K_{roll} \cdot r \cdot v) = \frac{\frac{T_{gaze}}{2} + \frac{l_r}{v} - \frac{ml_r}{2lC_r} \cdot v}{\theta_z} \cdot r \tag{8}$$

Wherein: $C_r$ is rear wheel cornering power; l is the wheel base; $l_r$ is the separation distance from the center of gravity to the rear axle $l_r$; m is the vehicle mass; and v is the vehicle speed.

Figure 5:
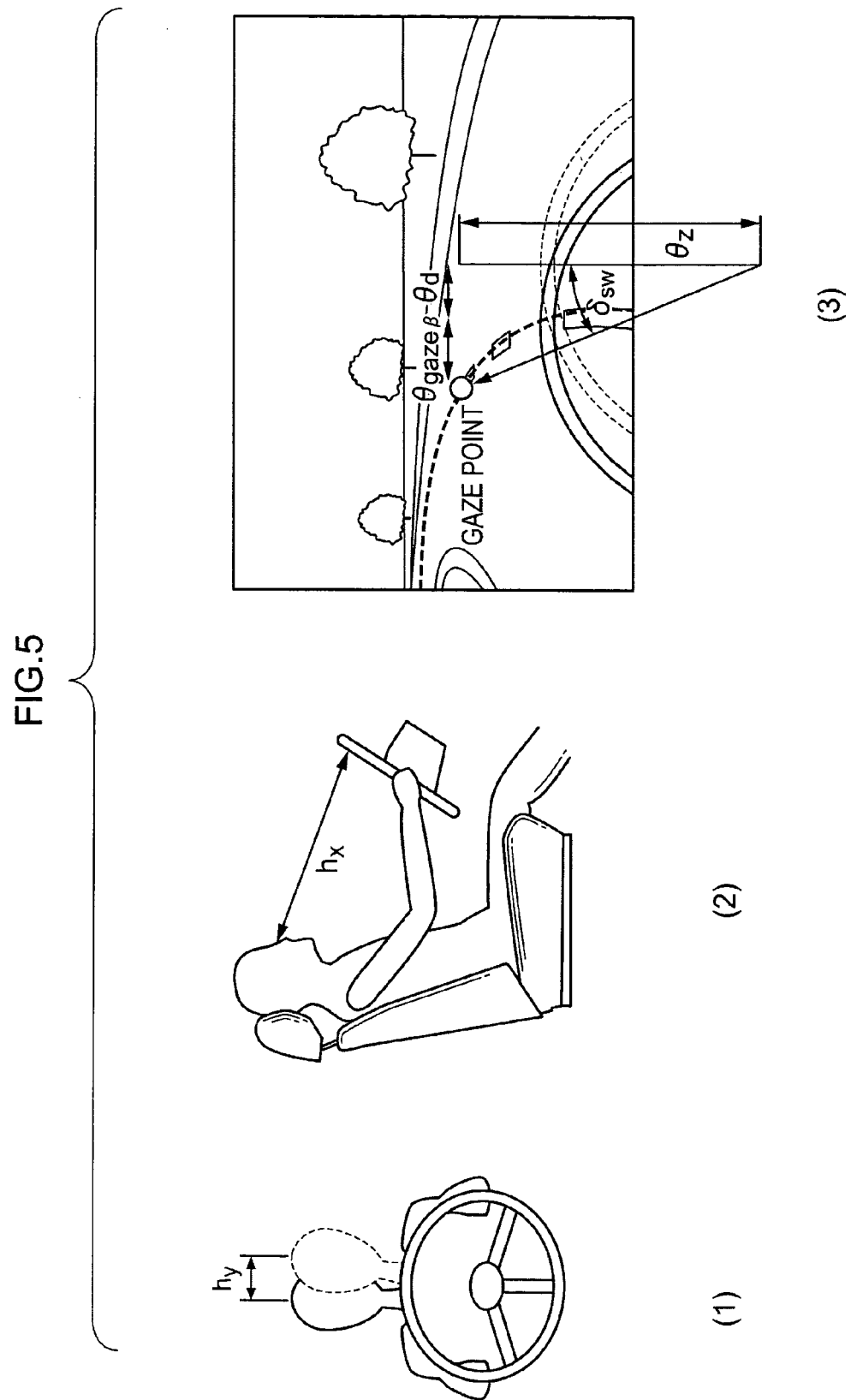
FIG. 5 shows an image (1) illustrating a situation in which a driver's head has moved, an image (2) illustrating the separation distance between a driver's head and a steering wheel center, and an image (3) illustrating a relationship between a steering wheel angle, a forward gaze angle and a relative depression angle when a driver's head has moved.

The relationship in Equation (8) is a relationship equation under the assumption that the point of view of the driver does not change. However, it is necessary to consider changes to the posture of the driver, namely to the position of the point of view of the driver, occurring during actual vehicle travel due to the influence of lateral acceleration. As shown in FIG. 5(1), the driver's head is moved by $h_y$ proportional to vehicle lateral acceleration in the direction to resist the lateral acceleration, and the center of the steering wheel as viewed from the driver is moved towards the turn outside by $\theta_d$ as derived by following Equation (9).

Equation (9)

$$\theta_d = \tan^{-1} \frac{h_y}{h_x} \tag{9}$$

The separation distance from the driver's head to the steering wheel center is $h_x$ (see FIG. 5(2)). Therefore, as shown in FIG. 5(3), the following Equation (10) expresses conditions to coincide the direction of steering wheel angle $\delta_{SW}$ during driver head movement (the direction of the steering wheel reference position) with the direction of the forward gaze point.

Equation (10)

$$\tan(\delta_{sw} - K_{roll} \cdot r \cdot v) = \frac{\left( \frac{T_{gaze}}{2} + \frac{l_r}{v} - \frac{ml_r}{2lC_r} \cdot v \right) \cdot r + \theta_d}{\theta_z} \tag{10}$$

In the present exemplary embodiment the movement $h_y$ when a lateral acceleration has occurred of 9.8 (m/s²)=$h_{ymax}$, and $\theta_d$ is formulated by the following Equation (11).

Equation (11)

$$\theta_d = \tan^{-1}\frac{h_{y\,max} \cdot g_y}{9.8 \cdot h_x} \quad (11)$$

The relationship between the lateral acceleration and the yaw angular velocity (under conditions in which the slip angle does not increase) is expressed by the following Equation (12).

Equation (12)

$$g_y = v \cdot r \quad (12)$$

The relationship of the following Equation (13) is derived by considering Equation (11) and Equation (12) above.

Equation (13)

$$\tan(\delta_{sw} - K_{roll} \cdot r \cdot v) = \frac{\left(\frac{T_{gaze}}{2} + \frac{l_r}{v} - \frac{ml_r}{2lC_r} \cdot v\right) \cdot r + \tan^{-1}\frac{h_{y\,max} \cdot r \cdot v}{9.8 \cdot h_x}}{\theta_z} \quad (13)$$

The relative depression angle $\theta_z$ holds the relationship expressed by the following Equation (14), based on the steering wheel center depression angle $\theta_{zsw}$ from the driver's viewpoint to the steering wheel center, the forward gaze time $T_{gaze}$, and the eye-point height $h_{eye}$.

Equation (14)

$$\theta_z = \theta_{zsw} - \tan^{-1}\frac{h_{eye}}{T_{gaze} \cdot v} \cong \theta_{zsw} - \frac{h_{eye}}{T_{gaze} \cdot v} \quad (14)$$

Equation (13) above can be written as the following Equation (15) using Equation (14) above.

Equation (15)

$$\tan(\delta_{sw} - K_{roll} \cdot r \cdot v) = \frac{\left(\frac{T_{gaze}}{2} + \frac{l_r}{v} - \frac{ml_r}{2lC_r} \cdot v\right) \cdot r + \tan^{-1}\frac{h_{y\,max} \cdot r \cdot v}{9.8 \cdot h_x}}{\theta_{zsw} - \frac{h_{eye}}{T_{gaze} \cdot v}} \quad (15)$$

The following assumption is made.

$$h_{ymax} \cdot r \cdot v << 9.8 \cdot h_x$$

Using this formula enables Equation (15) to be written as the following Equation (16).

Equation (16)

$$r = \frac{\theta_{zsw} - \frac{h_{eye}}{T_{gaze} \cdot v}}{\frac{T_{gaze}}{2} + \frac{l_r}{v} - \frac{ml_r}{2lC_r} \cdot v + \frac{h_{y\,max} \cdot v}{9.8 \cdot h_x}} \cdot \tan(\delta_{sw} = K_{roll} \cdot r \cdot v) \quad (16)$$

Figure 6:
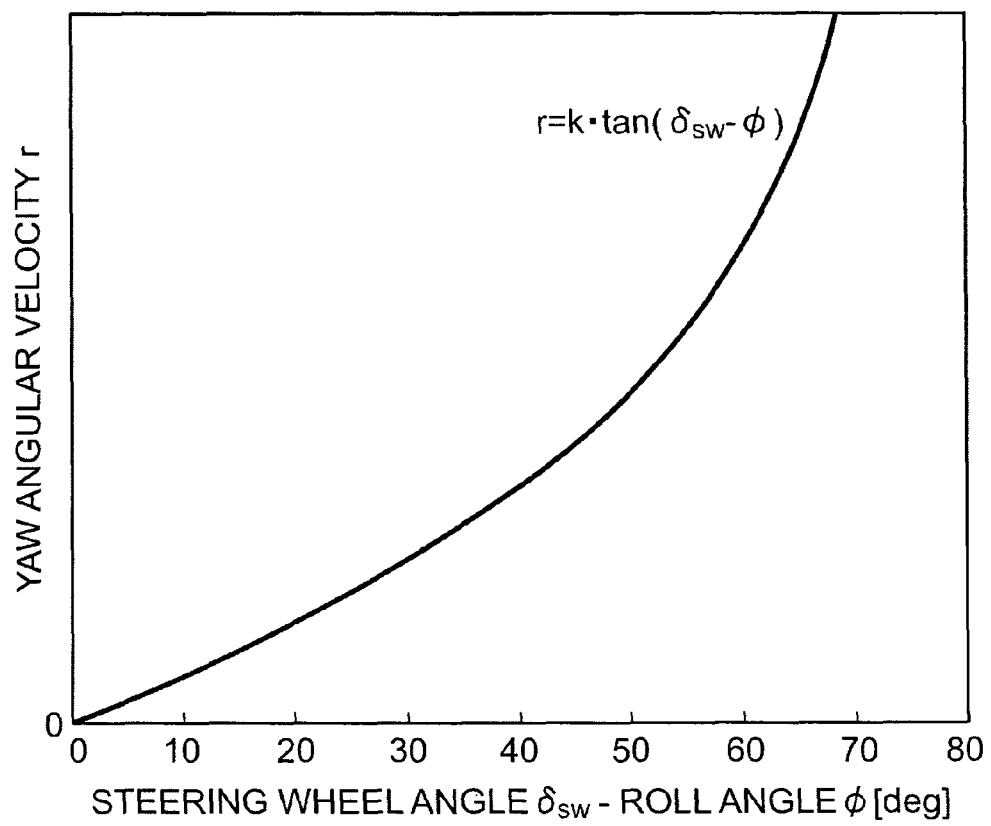
FIG. 6 is a graph illustrating a relationship of yaw angular velocity to a relative angle of a steering wheel angle to a roll angle.

In Equation (16) above the yaw angular velocity r is expressed as proportional to the tangent to the relative angle ($\delta_{SW}-\phi$) between the steering wheel angle $\delta_{SW}$ and the roll angle $\phi(=K_{roll} \cdot r \cdot v)$, as shown by the intermittent line of FIG. 6. Equation (16) expresses an example of a relationship between the steering wheel angle for each vehicle speed and the yaw angular velocity in the present invention.

The yaw angular velocity gain k is a value of yaw angular velocity r divided by steering wheel angle $\delta_{SW}$, and the relationship of the following Equation (17) holds.

Equation (17)

$$r = k \cdot \delta_{SW} \quad (17)$$

The following Equation (18) for the relationship formula between steering wheel angle $\delta_{SW}$ and yaw angular velocity gain k is derived by substituting Equation (17) in Equation (16).

Equation (18)

$$k \cdot \delta_{sw} = \frac{\theta_{zsw} - \frac{h_{eye}}{T_{gaze} \cdot v}}{\frac{T_{gaze}}{2} + \frac{l_r}{v} - \frac{ml_r}{2lC_r} \cdot v + \frac{h_{y\,max} \cdot v}{9.8 \cdot h_x}} \cdot \tan(\delta_{sw} - K_{roll} \cdot k \cdot \delta_{sw} \cdot v) \quad (18)$$

Yaw angular velocity gain k is present in both the left and right hand sides of the above Equation (18), and in the present exemplary embodiment a map is produced by numerically solving the yaw angular velocity gain k corresponding to the vehicle speed v and the steering wheel angle $\delta_{SW}$. Accordingly, as shown in FIG. 7, a map is obtained expressing a relationship between yaw angular velocity gain k and steering wheel angle $\delta_{SW}$ for each vehicle speed.

Figure 7:
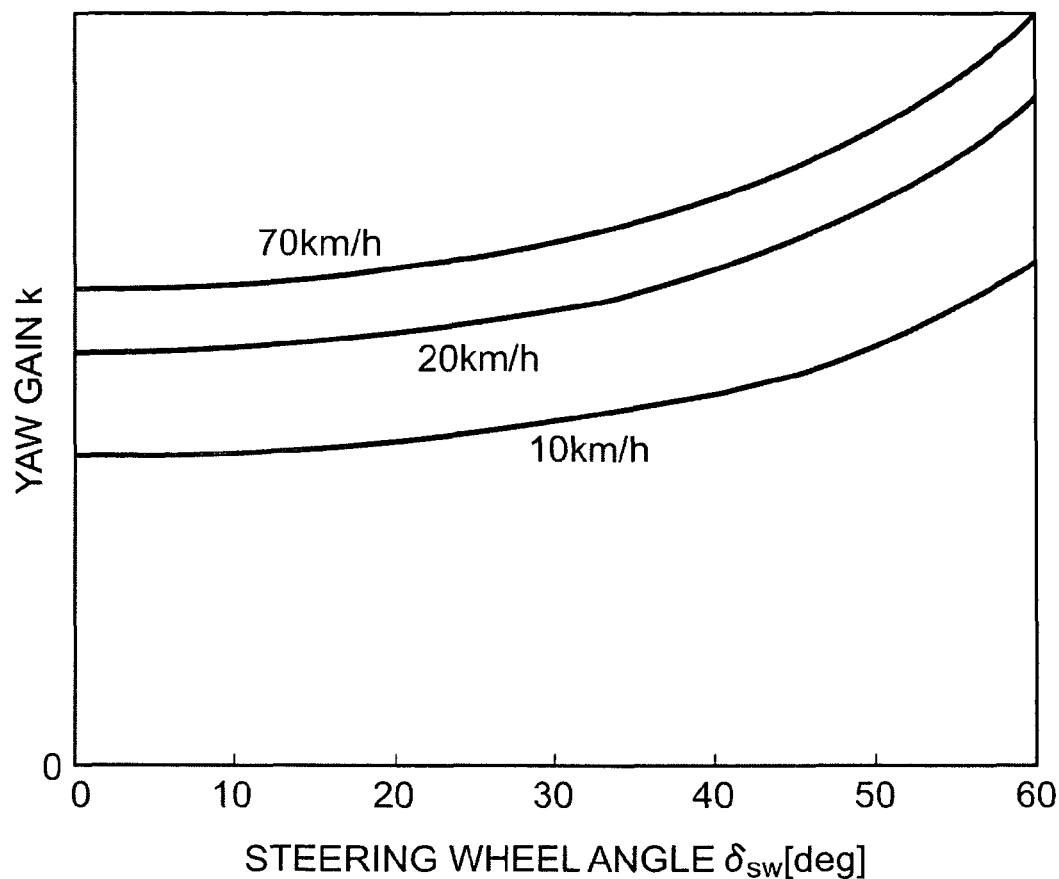
FIG. 7 is a graph illustrating a relationship of yaw angular velocity gain to steering wheel angle.

Based on the principles explained above, a first map defining the relationship between steering wheel angle and yaw angular velocity gain at each vehicle speed, as shown by the solid lines in FIG. 7, is accordingly stored in the first map storage 40 of the vehicle steering apparatus 10 according to the present exemplary embodiment.

The yaw gain computation section 42 computes a yaw angular velocity gain target value corresponding to the vehicle speed detected by the vehicle speed sensor 30 and the steering wheel angle detected by the steering wheel angle sensor 32 according to the first map stored in the first map storage 40.

Explanation follows regarding a control method for executing yaw angular velocity gain to the target computed based on such a first map.

The target yaw angular velocity gain is realized by actively changing the characteristics of the variable steering gear ratio mechanism 16, provided between the steering wheel and the mechanism for turning the front wheels by the actual steering angle, according to the vehicle speed. If the dynamic characteristics of the vehicle motion are ignored then the relationship expressed by the following Equation (19) is held between the front wheel actual steering angle $\delta_f$, and the yaw angular velocity r.

Equation (19)

$$r = \frac{v}{l - \frac{l_f C_f - l_r C_r}{2lC_f C_r}mv^2} \cdot \delta_f \quad (19)$$

Wherein $C_f$ is the front wheel cornering power. If $g_{sw}$ expresses the steering gear ratio between the steering wheel angle $\delta_{SW}$ and the front wheel actual steering angle $\delta_f$ then the following Equation (20) is obtained.

Equation (20)

$$\delta_{SW} = g_{SW} \cdot \delta_f \quad (20)$$

The steering gear ratio $g_{sw}$ for executing the yaw angular velocity gain k computed from the map shown in FIG. 7 using above Equation (10) and Equation (20) is expressed according to the following Equation (21).

Equation (21)

$$g_{sw} = \frac{v}{1 - \frac{l_f C_f - l_r C_r}{2l C_f C_r} mv^2} \cdot \frac{1}{k} \quad (21)$$

The gear ratio computation section 44 computes the steering gear ratio according to Equation (21), based on the yaw angular velocity gain k computed as the target by the yaw gain computation section 42 and the vehicle speed v detected by the vehicle speed sensor 30.

The gear ratio controller 46 controls the steering gear ratio by outputting a gear ratio instruction signal to the variable steering gear ratio mechanism 16 to change to the computed steering gear ratio.

However when controlling the steering system according to Equation (16), the yaw angular velocity becomes infinitely large when the relative angle between the steering wheel angle and the roll angle approaches 90 degrees, and so all driving operations are performed within a steering wheel angle region of 90 degrees. Such characteristics make it unnecessary to change grip on the steering wheel. However there is a feeling of hypersensitivity to changes in vehicle motion in response to steering wheel operation, with this sometimes being detrimental to steerability.

Whether or not characteristics of hypersensitivity to changes in vehicle motion, with a detrimental effect on steerability, is felt is investigated by employing a vehicle in which various changes are made to yaw angular velocity gradients in response to steering wheel angles. Sensory evaluation tests are then performed after giving steering correction tasks from a normal circular turning path. It is found that while differences between individuals arise, the upper limit to yaw angular velocity gradient to steering wheel angle for cases in which a feeling corresponding to normal power steering characteristics is imparted, namely the limit to gradient above which a detrimental effect to steerability arises, is a yaw angular velocity gradient to steering wheel angle between 0.35 to 0.38 (1/s).

However, by setting a large resistance-feeling, the force required for steering from the driver's hands increases, resulting in an increase in equivalent stiffness of the hands, and enabling steering wheel steering stability to be enhanced. The present invention utilizes this knowledge to monotonically increase the resistance-feel level as the physical turn amount increases, enhancing driver hand equivalent stiffness in the region where hypersensitivity is felt to changes in vehicle motion in response to steering wheel operation, and thereby enhancing steering stability. In the present exemplary embodiment the yaw angular velocity is employed as a physical turn amount.

Explanation follows regarding the principles for controlling the resistance-feel level in the present exemplary embodiment.

First, explanation follows regarding the relationship between physical amount and perceived amount in order to explain the resistance-feel level. The relationship between physical amount and perceived amount is investigated here in relation to steering assistance torque and stiffness. Note that a steering simulator is employed in the investigation in which it is possible to freely vary the operation resistance-feeling characteristics (relationship of steering wheel angle y to steering wheel torque x).

A "magnitude estimation method" is employed in the investigations related to steering wheel torque. Such a method elucidates the relationship between the physical amount and the perceived amount by making various changes to the steering wheel torque and eliciting numerical responses for the magnitude of the physical amount felt each time.

Figure 8:
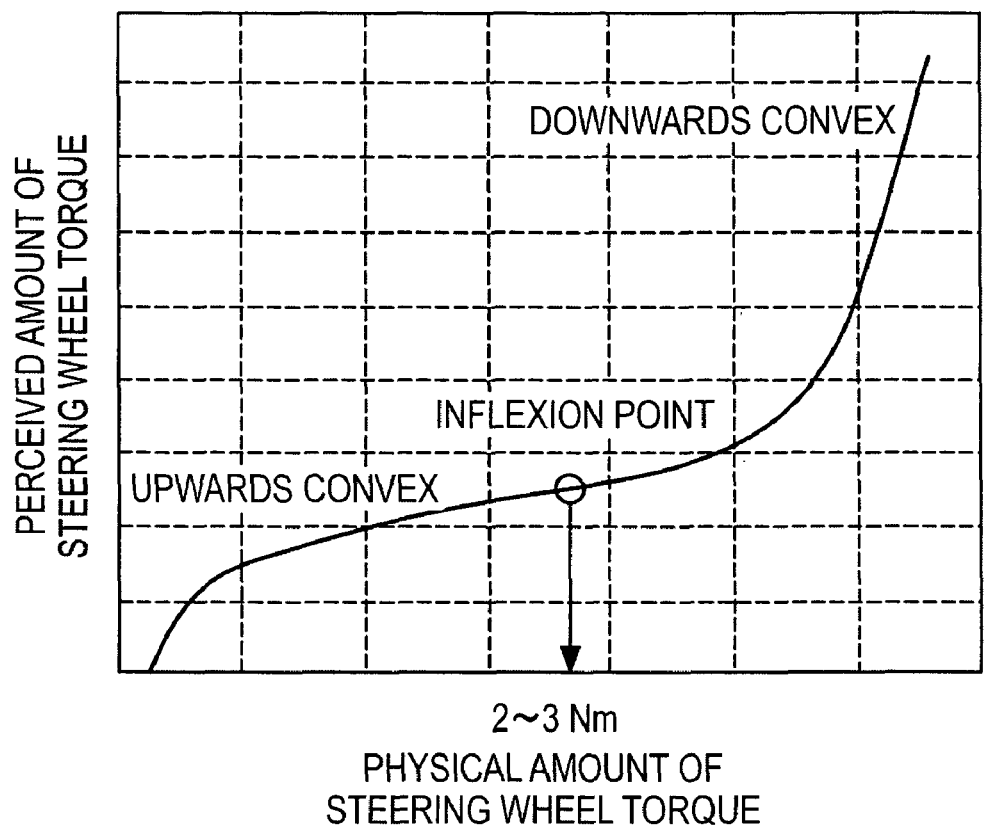
FIG. 8 is a graph illustrating a correspondence between a physical amount of steering wheel torque and a perceived amount of steering wheel torque.

As a result a relationship such as the one illustrated in FIG. 8 is obtained. Namely, even though there is a monotonical increase in the perceived amount in response to the physical amount of steering wheel torque, at a boundary of a given region the characteristic of perceived amount of steering wheel torque changes from an upwards facing convex curve to a downwards facing convex curve (namely the amount of increase in the perceived amount in response to an increase in steering wheel torque physical amount has a characteristic of changing from tending to gradually decrease to tending to gradually increase). This inflexion point is at a steering wheel torque of about 2 to 3 Nm. There are three investigation subjects and the results of each subject exhibit the same trend.

Figure 9A:
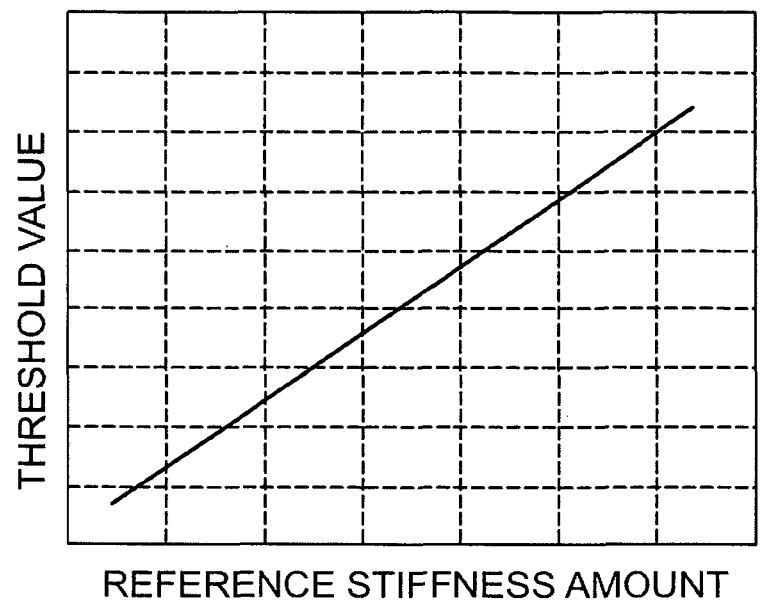
FIG. 9A is a graph illustrating a relationship between reference stiffness amounts and threshold values.
Figure 9B:
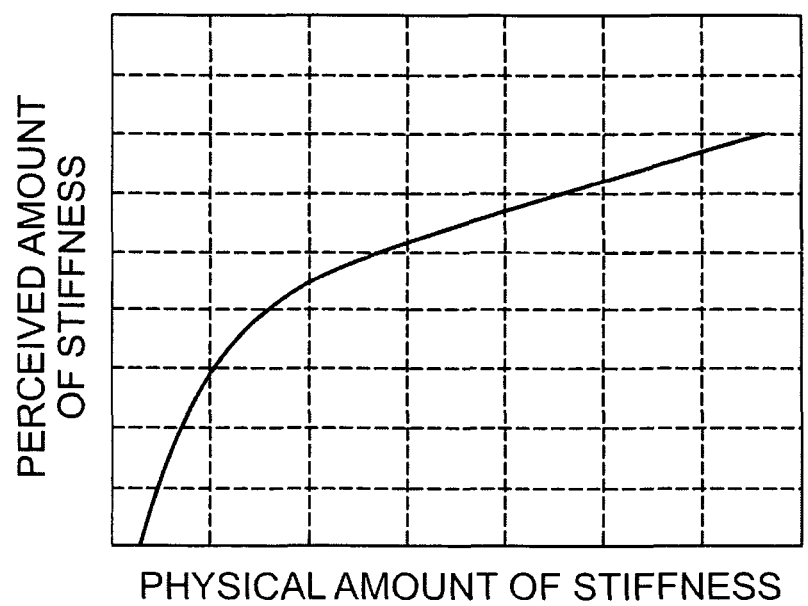
FIG. 9B is a graph illustrating a relationship between a physical amount of stiffness and a perceived amount of stiffness.

A "method of limits" is employed in investigation related to stiffness. This is a method that investigates the amount of change required before a change can first be perceived (threshold value) by gradually changing stiffness from a given stiffness. As a result it is known that there is a proportional relationship between the threshold value and the given reference stiffness, as shown in FIG. 9A. There are five subjects and the results of each subject exhibit the same trend. This is a well-known trend known as Weber's law. When this trend applies then it is known that the perceived amount is proportional to the logarithm of the physical amount, also known as the Weber-Fechner law. This relationship is illustrated in FIG. 9B. The perceived amount of stiffness is thus defined as being proportional to the logarithm of the physical amount of stiffness.

Explanation follows regarding the relationship between the perceived amount of steering wheel torque and the perceived amount of stiffness.

The steering simulator mentioned above is employed to set various combinations of steering wheel torque and stiffness. In relation to the resistance-feeling when a very small steering adjustment is made from these set values, a combination is searched for that gives the same resistance-feeling feeling as that of a reference combination.

Figure 10:
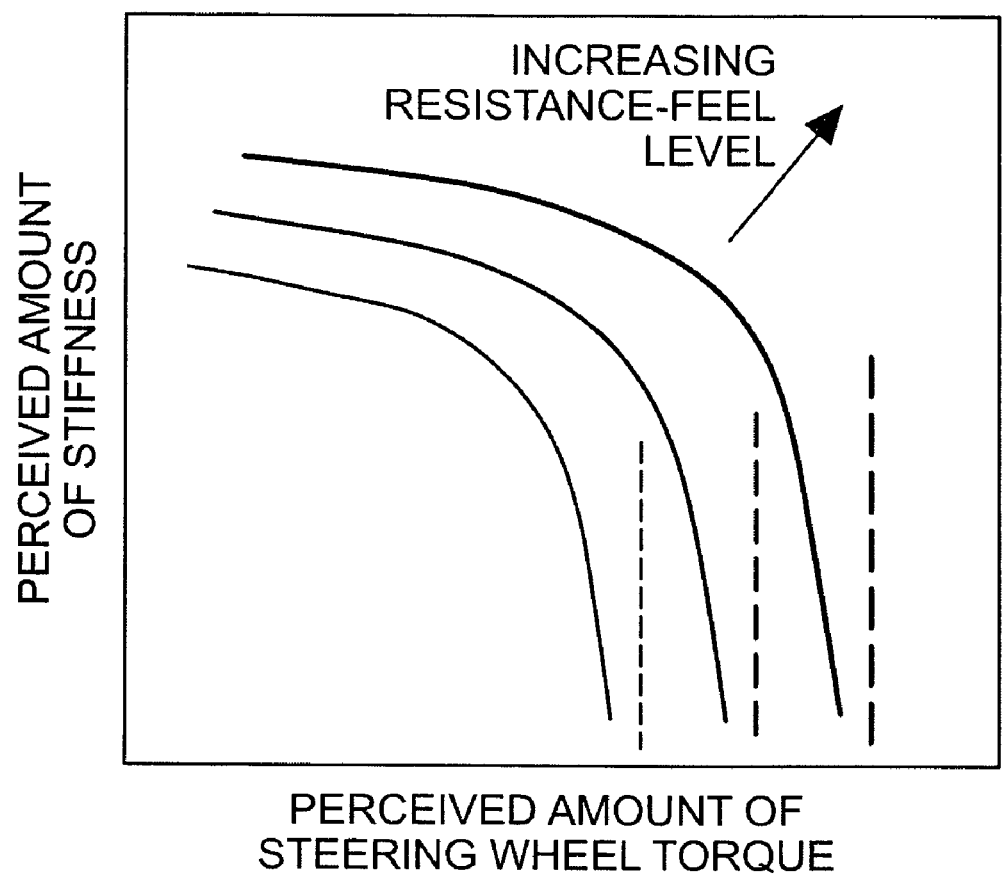
FIG. 10 is a graph illustrating a relationship between a perceived amount of steering wheel torque and a perceived amount of stiffness when constant resistance-feel level is achieved.

As a result, in relationships between steering wheel torque and stiffness giving the same feeling of resistance-feeling, when the perceived amounts of both factors are compared it is found that the stiffness has a relationship that monotonically reduces in response to steering wheel torque, but the perceived amount of steering wheel torque becomes saturated and is asymptotic to a fixed value. As shown in FIG. 10, it is found that the same trend applies even when the combination acting as a reference is changed, with the asymptotic line shifting to the right hand side when the resistance-feel level acting as a reference is large. Hence when the steering reaction force characteristics (the relationship between steering wheel torque and steering wheel angle) have such a relationship between steering wheel torque and stiffness it is thus thought to be possible for a driver to steer with a constant resistance-feel level.

Explanation follows regarding the relationship between the target yaw angular velocity and the resistance-feel level in the present exemplary embodiment.

In the present exemplary embodiment the resistance-feel level is monotonically increased with increasing yaw angular velocity serving as a physical turn amount, as described above. Namely, the resistance-feel level defined from the perceived amount of proportional change in the steering assistance torque in response to steering wheel angle change (stiffness) and from the perceived amount of steering wheel torque is determined so as to monotonically increase with increasing yaw angular velocity. The relationship between the yaw angular velocity and the resistance-feel level is employed to determine the steering reaction force characteristics.

It is possible to achieve a gradual increase in resistance-feel level with increasing yaw angular velocity by gradually moving across to higher resistance-feeling contour lines as the yaw angular velocity is increased.

In the present exemplary embodiment the resistance-feel level is also determined based on the relationship between the yaw angular velocity and the resistance-feel level such that the resistance-feel level monotonically increases as the yaw angular velocity increases. Control is performed based on the relationship between the yaw angular velocity, the steering wheel angle and the steering wheel torque (the steering reaction force characteristics map) so as to realize the target steering wheel torque.

The second map storage 50 is pre-stored with a second map expressing corresponding relationships between the yaw angular velocity, the steering wheel torque and the steering wheel angle that have been predetermined by a method described later based on the relationship between the yaw angular velocity and the resistance-feel level.

Based on a steering wheel angle signal input from the steering wheel angle sensor 32, the yaw angular velocity acquired by the yaw angular velocity acquisition section 48 and the stored second map, the torque target setting section 52 sets as the target value a steering wheel torque corresponding to the detected steering wheel angle and the acquired yaw angular velocity.

The assistance controller 54 computes an instruction value for torque assistance level based on the set steering wheel torque target value and the steering wheel torque detected by the steering wheel torque sensor 34. The assistance controller 54 controls driving of the electrically powered steering apparatus motor 28 based on the computed torque assistance level instruction value, such that the steering wheel torque acting on the steering wheel 12 becomes the steering wheel torque target value. Drive control here of the electrically powered steering apparatus motor 28 may be achieved by Proportional-Integral (PI) control based on for example the deviation between the steering wheel torque target value and the detected steering wheel torque.

Explanation follows regarding operation of the vehicle steering apparatus 10 according to the present exemplary embodiment.

Figure 11:
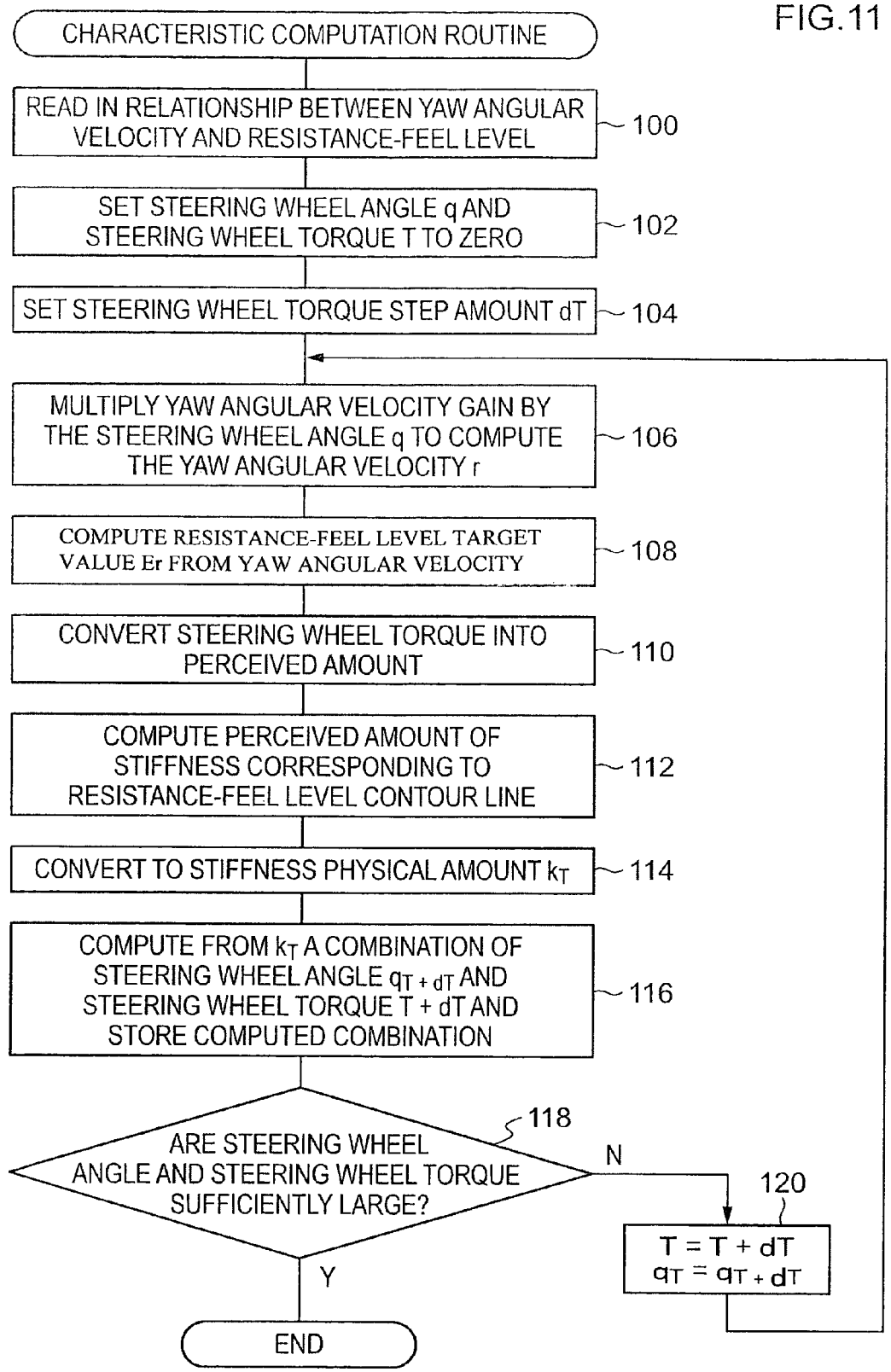
FIG. 11 is a flow chart illustrating contents of a characteristic computation routine of a vehicle steering apparatus according to the first exemplary embodiment of the present invention.

First, while in an off-line state, a characteristic computation routine as illustrated in FIG. 11 is executed in the computer 24. Configuration may be made such that the characteristic computation routine is executed by an external apparatus.

At step 100 a relationship between yaw angular velocity and resistance-feel level stored in a memory (not shown in the drawings) is read out, and then at step 102 the steering wheel angle q and the steering wheel torque T are set to 0. Then at step 104 a steering wheel torque step amount dT is set to a specific value.

Figure 12:
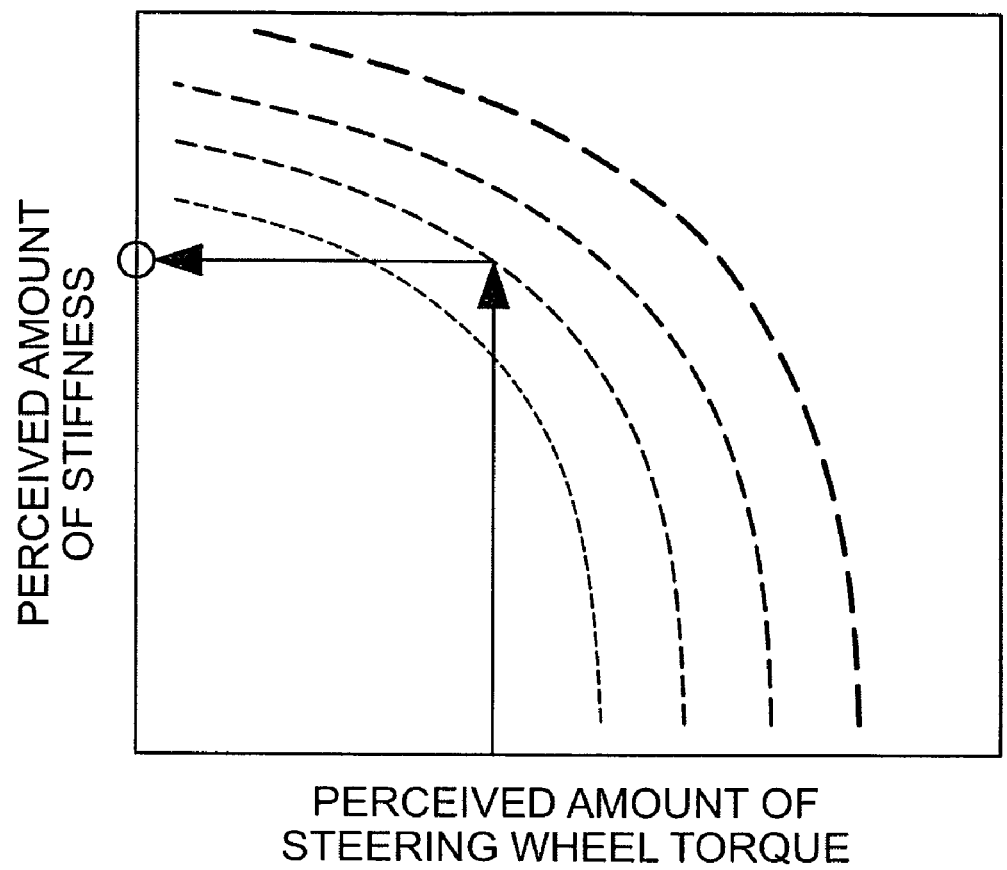
FIG. 12 is a map illustrating contour lines expressing a relationship between a perceived amount of steering wheel torque and a perceived amount of stiffness when a constant resistance-feel level is achieved.

At the next step 106 a yaw angular velocity gain k is multiplied by the steering wheel angle q to compute the yaw angular velocity r. Then at step 108, a resistance-feel level target value $E_r$ is computed according to the yaw angular velocity r based on the relationship between the read yaw angular velocity and the resistance-feel level. For example, the resistance-feel level target value $E_0$ is computed when the yaw angular velocity r is 0. Then at step 110 the steering wheel torque T is converted into a perceived amount of steering wheel torque. Then at step 112, using the resistance-feeling contour line map that is stored in the memory and expresses relationships between perceived amounts of steering wheel torque and perceived amounts of stiffness that give a constant resistance-feel level, as shown in FIG. 12, the perceived amount of stiffness corresponding to the resistance-feel level target value $E_r$ computed at step 108 and to the perceived amount of steering wheel torque computed at step 110 is computed by reverse resolution of the map.

At step 114 the computed perceived amount of stiffness at step 112 is converted into a stiffness physical amount $k_T$. For example, a stiffness physical amount $k_0$ is obtained when the steering wheel torque T is 0.

Then at step 116, from the stiffness physical amount $k_T$ computed at step 114 a combination of steering wheel angle $q_{T+dT}$ and steering wheel torque T+dT is computed according to the following Equation (22) and stored in a memory.

Equation (22)

$$q_{T+dT} = \int_{T}^{T+dT} \frac{1}{k_T} dT + q_T \qquad (22)$$

For example, a combination of steering wheel torque and steering wheel angle is computed such that the stiffness is $k_0$ when the steering wheel torque T approaches 0.

Then at step 118 determination is made as to whether or not the steering wheel angle and the steering wheel torque are sufficiently large. Determination is that a corresponding relationship between the steering wheel torque and the steering wheel angle has been obtained when the steering wheel angle and the steering wheel torque are sufficiently large, and the characteristic computation routine is then ended. However at step 120, when the steering wheel angle and the steering wheel torque are not sufficiently large, the steering wheel torque T is incremented by the step amount dT, the steering wheel angle q is refreshed with the steering wheel angle $q_{T+dT}$ computed according to Equation (22), and then the routine returns to step 106.

In the characteristic computation routine, respective combinations of yaw angular velocity, steering wheel torque and steering wheel angle are thereby computed by gradually increasing the steering wheel torque each time by the step amount dT. Then a second map is generated by line interpolation based on the corresponding relationships of yaw angular velocity, steering wheel torque and steering wheel angle over the entire computed range. Then thus generated second map is stored in the second map storage 50 such that the desired relationship between yaw angular velocity and resistance-feeling can be realized by employing the second map to control the steering reaction force characteristics.

Figure 13:
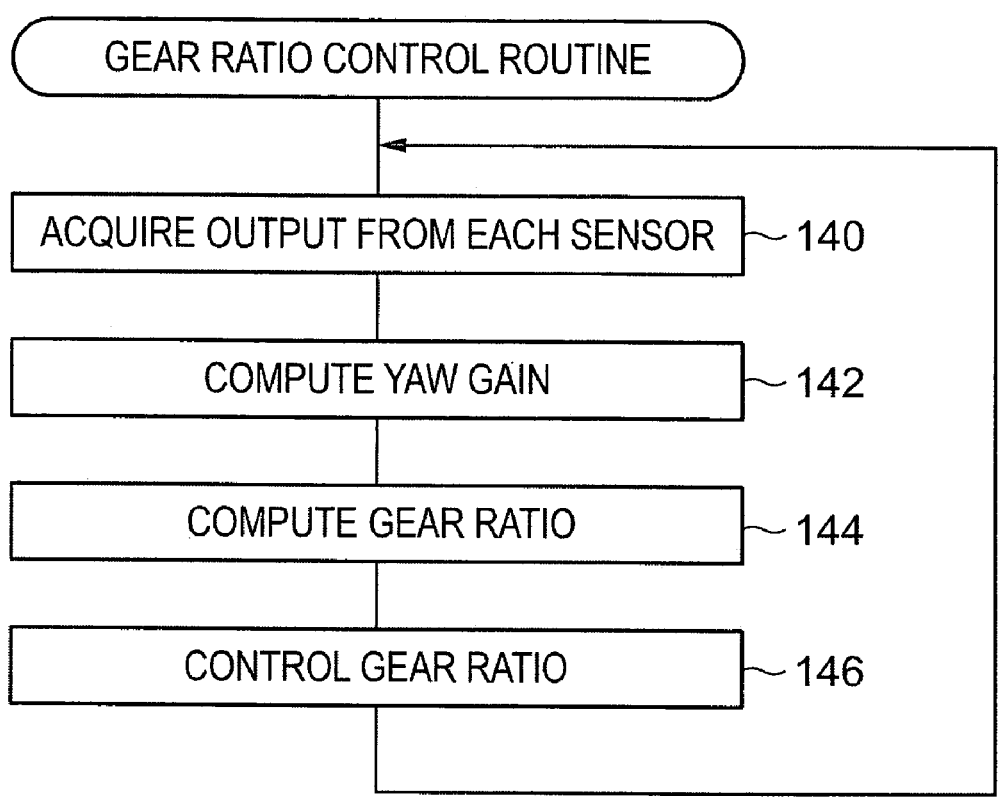
FIG. 13 is a flow chart illustrating contents of a gear ratio control routine of a vehicle steering apparatus according to the first exemplary embodiment of the present invention.

The gear ratio control routine illustrated in FIG. 13 is executed in the computer 24 while the vehicle installed with the vehicle steering apparatus 10 is traveling.

First at step 140 the vehicle speed detected by the vehicle speed sensor 30 and the steering wheel angle computed by the steering wheel angle sensor 32 are respectively acquired. Then at step 142 a yaw angular velocity gain target value is computed from the vehicle speed and the steering wheel angle acquired at step 140 according to the first map stored in the first map storage 40.

At the next step 144 the steering gear ratio to realize the yaw angular velocity gain target value is computed according to Equation (21) from the vehicle speed acquired at step 140 and the yaw angular velocity gain target value computed at step 142. Then at step 146 a gear ratio instruction signal to change to the steering gear ratio computed at step 144 is output to the variable steering gear ratio mechanism 16 so as to control the steering gear ratio. The routine then returns to step 140.

Repeatedly performing the above processing results in respective realization of the repeatedly computed yaw angular velocity gain target values.

Figure 14:
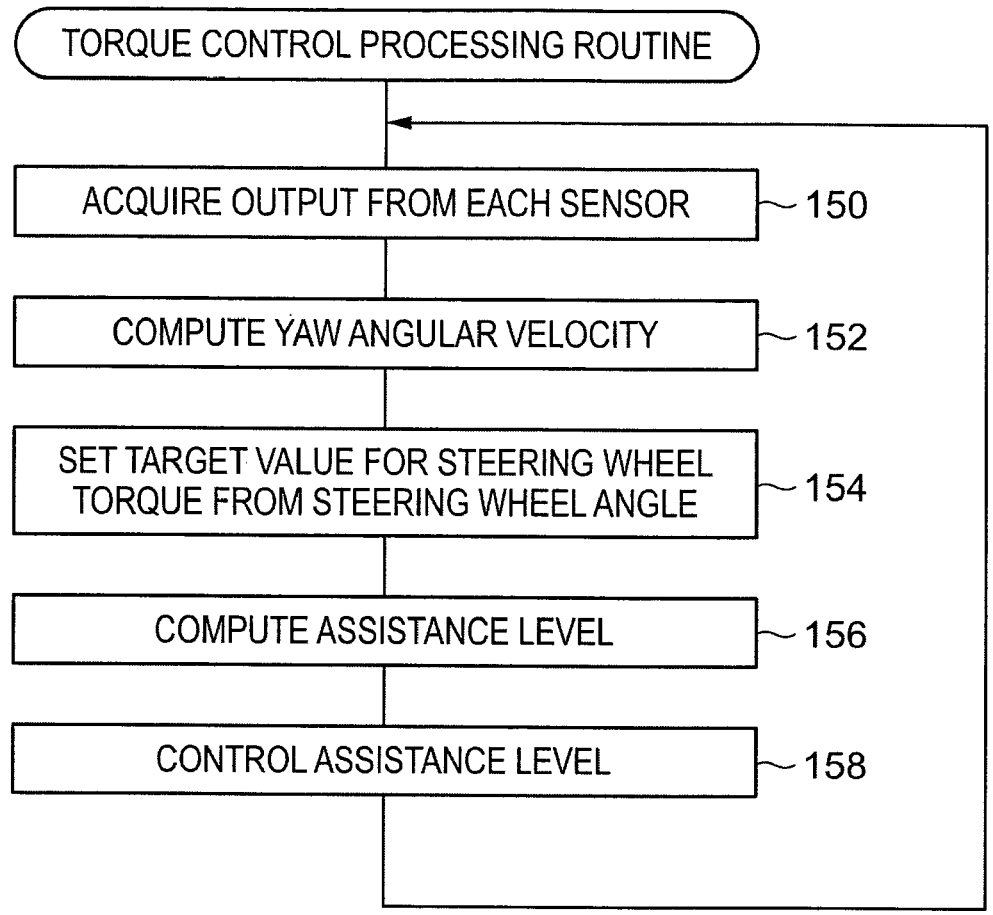
FIG. 14 is a flow chart illustrating contents of a torque control routine of a vehicle steering apparatus according to the first exemplary embodiment of the present invention.

A torque control routine illustrated in FIG. 14 is also executed in the computer 24 while the vehicle installed with the vehicle steering apparatus 10 is traveling.

First at step 150 acquisition is made of the steering wheel torque detected by the steering wheel torque sensor 34 and the steering wheel angle detected by the steering wheel angle sensor 32. Then in step 152 the steering wheel angle acquired at step 150 is multiplied by the yaw gain to compute the yaw angular velocity.

Then in step 154 the second map is read out from the second map storage 50 and a steering wheel torque corresponding to the steering wheel angle acquired at step 150 and to the yaw angular velocity computed at step 152 is set as the target value.

Then at step 156 a torque assistance level instruction value is computed, based on the steering wheel torque acquired at step 150 and the steering wheel torque target value set at step 154. Then at step 158 driving of the electrically powered steering apparatus motor 28 is controlled based on the torque assistance level target value computed at step 156 such that the steering wheel torque acting on the steering wheel 12 becomes the steering wheel torque target value. The routine then returns to step 150.

As explained above, according to the vehicle steering apparatus according to the first exemplary embodiment, a yaw angular velocity gain target value is computed according to a map indicating relationships between steering wheel angle and yaw angular velocity gain determined such that the direction as seen from the view point of a driver of a target destination point on a target course for vehicle travel at a predetermined time after a forward gaze and the direction as seen from the view point of the driver of a reference position on the steering wheel match each other. By accordingly controlling the steering gear ratio the sensation of driver-vehicle togetherness can thereby be enhanced, the driver does not feel uncomfortable and steering can be performed to match driver sensation.

Deterioration in steerability is also suppressed from occurring by making the resistance-feel level monotonically increase with increasing yaw angular velocity, and the steering wheel direction and the direction of the point of gaze can also be made to match each other even for a large steering wheel angle. As a result there is no need for a driver to change grip position on the steering wheel.

Explanation follows regarding a vehicle steering apparatus of a second exemplary embodiment. Configuration portions similar to those of the first exemplary embodiment are allocated the same reference numeral and further explanation is omitted.

The second exemplary embodiment differs from the first exemplary embodiment in that a target value for yaw angular velocity is computed, and the steering gear ratio is controlled so as to realize the yaw angular velocity target value.

Figure 15:
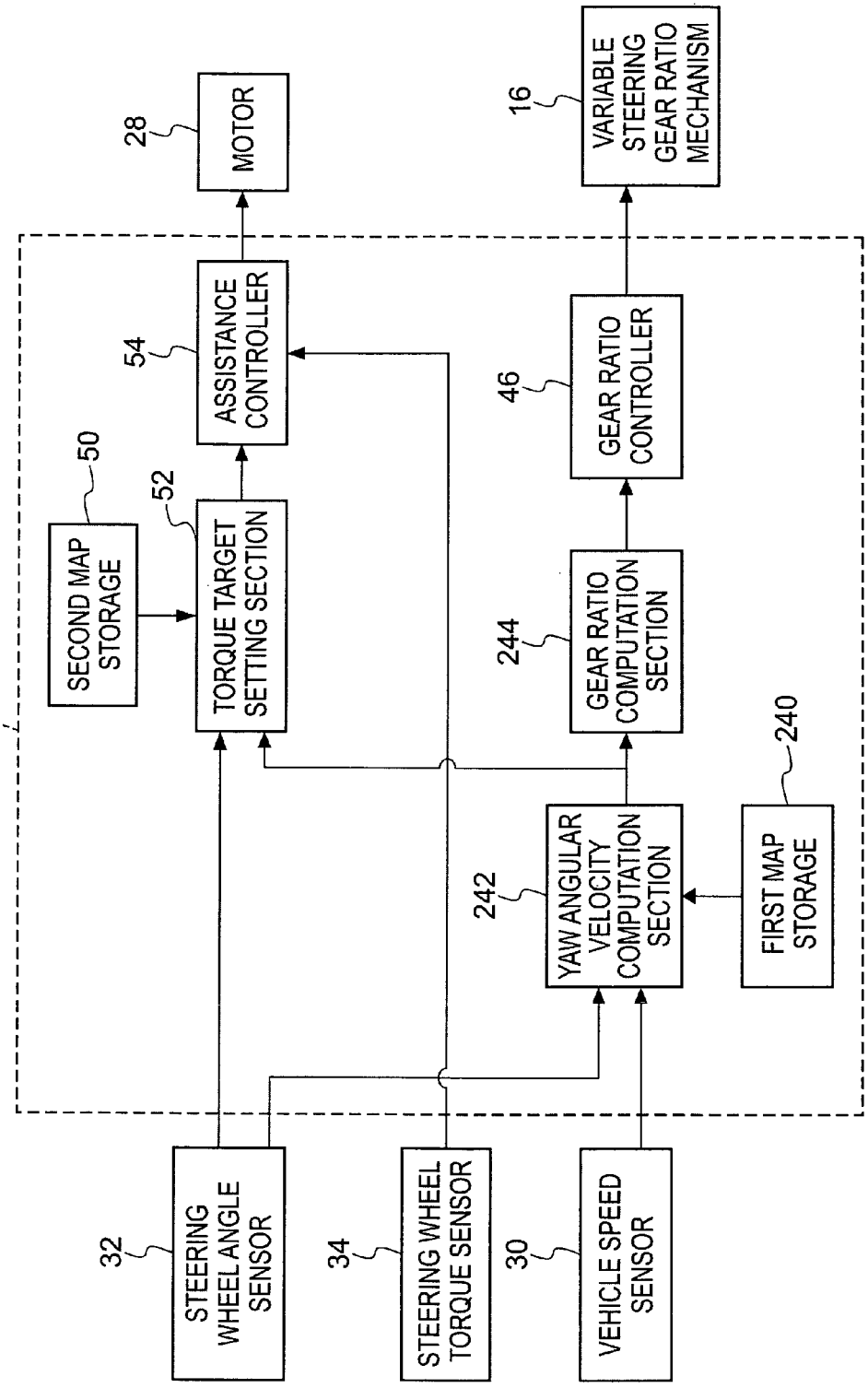
FIG. 15 is a block diagram illustrating a configuration of a computer of a vehicle steering apparatus according to a second exemplary embodiment of the present invention.

As shown in FIG. 15, a computer 224 of a vehicle steering apparatus according to the second exemplary embodiment includes: a first map storage 240 pre-stored with a first map indicating relationships between steering angle of the steering wheel 12, vehicle speed and yaw angular velocity; a yaw angular velocity computation section 242 for, based on the vehicle speed from a vehicle speed sensor 30 and the steering wheel angle from a steering wheel angle sensor 32, computing a target value of yaw angular velocity according to the first map stored in the first map storage 240; a gear ratio computation section 244 for computing a steering gear ratio for realizing the computed yaw angular velocity target value; a gear ratio controller 46; a second map storage 50; a torque target setting section 52; and an assistance controller 54.

Figure 16:
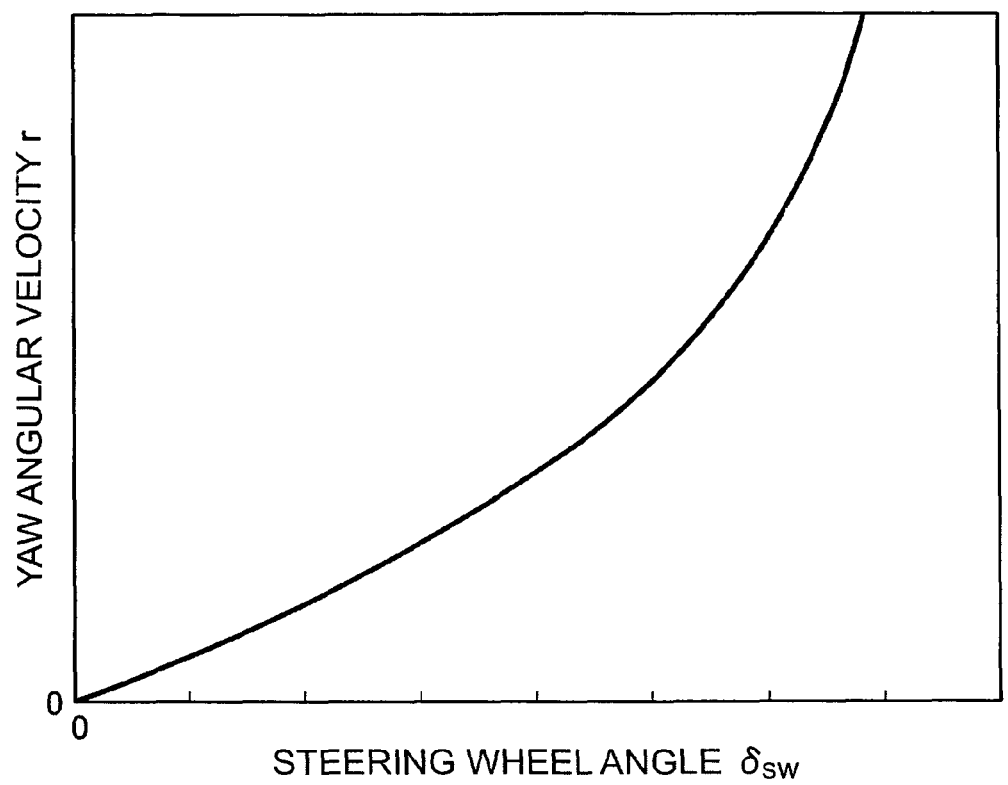
FIG. 16 is a graph illustrating a relationship of yaw angular velocity to steering wheel angle.

The relationship between steering wheel angle and yaw angular velocity, as shown in FIG. 16, is obtained for each vehicle speed as a result of numerically solving the Equation (16) explained in the first exemplary embodiment.

The first map storage 240 of the vehicle steering apparatus according to the present exemplary embodiment is stored with a first map with the relationship between steering wheel angle and yaw angular velocity as shown in the solid line in FIG. 16 determined for each vehicle speed.

The yaw angular velocity computation section 242 computes a yaw angular velocity corresponding to the vehicle speed detected by the vehicle speed sensor 30 and to the steering wheel angle detected by the steering wheel angle sensor 32 according to the first map stored in the first map storage 240.

Based on the yaw angular velocity r computed as a target by the yaw angular velocity computation section 242 and the vehicle speed v detected by the vehicle speed sensor 30, the gear ratio computation section 244 computes a front wheel actual steering angle $\delta_f$ for realizing the yaw angular velocity r to target. The gear ratio computation section 244 then computes a steering gear ratio according to Equation (20) based on the computed front wheel actual steering angle $\delta_f$ and steering wheel angle $\delta_{SW}$ detected by the steering wheel angle sensor 32.

Explanation follows regarding a gear ratio control routine according to the second exemplary embodiment.

First the vehicle speed detected by the vehicle speed sensor 30 and the steering wheel angle computed by the steering wheel angle sensor 32 are respectively acquired. Then a yaw angular velocity target value is computed from the acquired vehicle speed and the steering wheel angle according to the first map stored in the first map storage 240.

The steering gear ratio to realize the yaw angular velocity target value is then computed according to Equation (19) and Equation (20) from the acquired vehicle speed and the computed yaw angular velocity target value. A gear ratio instruction signal is output to the variable steering gear ratio mechanism 16 to change to the computed steering gear ratio so as to control the steering gear ratio. Processing then returns to the beginning.

Repeatedly performing the above processing, results in respective realization of the repeatedly computed yaw angular velocity target values.

Since other parts of the configuration and operation of the vehicle steering apparatus according to the second exemplary embodiment are similar to those of the first exemplary embodiment further explanation is omitted thereof As explained above, according to the vehicle steering apparatus of the second exemplary embodiment, a yaw angular velocity target value is computed according to a map indicating relationships between steering wheel angle and yaw angular velocity determined such that the direction as seen from the view point of a driver of a target destination point on a target course for vehicle travel at a predetermined time after a forward gaze and the direction as seen from the view point of the driver of a reference position on the steering wheel match each other. By controlling steering gear ratio thereto, the sensation of driver-vehicle togetherness can thereby be enhanced, the driver does not feel uncomfortable and steering can be performed to match driver sensation.

Explanation follows regarding a vehicle steering apparatus of a third exemplary embodiment. Configuration portions similar to those of the first exemplary embodiment are allocated the same reference numeral and further explanation is omitted.

The third exemplary embodiment mainly differs from the first exemplary embodiment in that levers for brake operation are provided to grip sections of the steering wheel.

Figure 17:
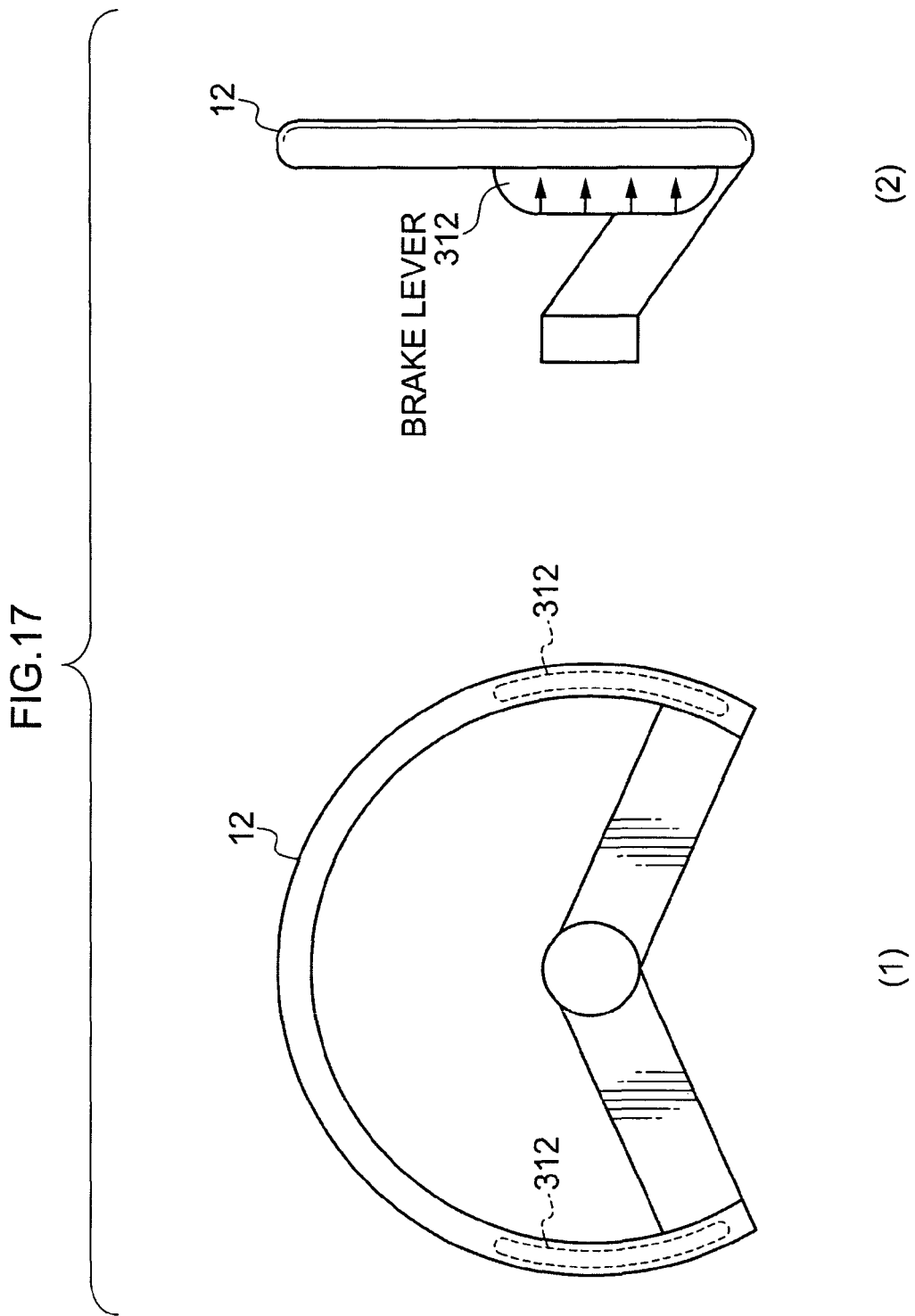
FIG. 17 (1) is a face-on view illustrating a configuration of a steering wheel of a vehicle steering apparatus according to a third exemplary embodiment of the present invention, and (2) is a side view illustrating a configuration of a steering wheel according to the third exemplary embodiment of the present invention.

In the vehicle steering apparatus according to the third exemplary embodiment, brake levers 312 for brake operation are provided to grip sections of the steering wheel 12, as shown in FIG. 17(1). As shown in FIG. 17(2), the brake lever 312 has a construction with a movement stroke corresponding to the grip force with which a driver is gripping the grip.

The brake levers 312 are provided at left and right grip sections.

Figure 18:
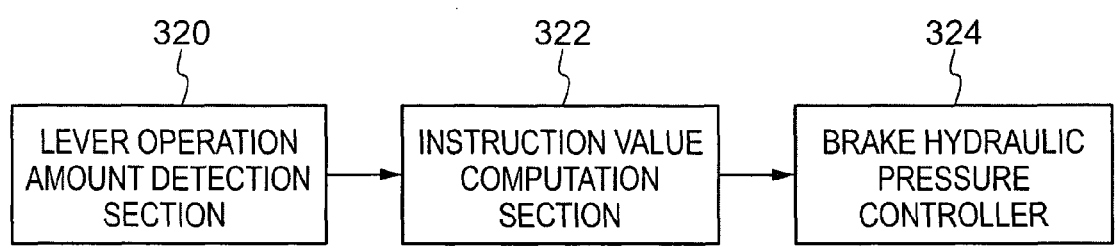
FIG. 18 is a schematic diagram illustrating a configuration of part of a vehicle steering apparatus according to the third exemplary embodiment of the present invention.

As shown in FIG. 18, the voltage application section according to the third exemplary embodiment also includes: a lever operation amount detection section 320 for detecting the amount of movement stroke of the brake levers 312; an instruction value computation section 322 for computing a braking force instruction value according to the detected movement stroke amount; and a brake hydraulic pressure controller 324 for computing a brake hydraulic pressure instruction value for each wheel based on a braking force instruction value and controlling the brake hydraulic pressure to each wheel.

The instruction value computation section 322 computes the braking force instruction value according to the respective movement stroke amounts of the left and right brake levers 312. The brake hydraulic pressure controller 324 issues a brake hydraulic pressure instruction value to each wheel based on the largest value out of the left and right instruction values.

Hysteresis characteristics may be provided between the driver gripping force and the movement stroke of the levers. Appropriately setting hysteresis characteristics results in easy braking operation that accords with human kinesthetic sense characteristics being realized.

Since other parts of the configuration and operation of the vehicle steering apparatus according to the third exemplary embodiment are similar to those of the first exemplary embodiment further explanation is omitted thereof.

By thus additionally installing the levers for brake operation to the grip sections of the steering wheel it is possible to realize finger-tip brake operation. It is known that brakes require about 0.6 s for operating, including switching over from accelerator operation to the brake pedal. However, in tests it has been ascertained that the operation time can be reduced to about 0.2 s when finger operation is employed.

Under the assumption of traveling at 60 km/h, shortening the idle run time by 0.4 s equates to shortening the braking distance by 6.7 m. Also, if it is assumed that travel is on a dry road surface with a deceleration of 9.8 m/s$^2$ under braking, then this equates to a reduction in impact speed of 14 km/h. This means that for example a 50 km/h impact is reduced to a 36 km/h impact, enabling the impact energy to be reduced by half. Therefore by focusing on the human physical functionality the vehicle steering apparatus according to the present exemplary embodiment enables the advantageous effect of raising safety to be obtained.

Explanation follows regarding a fourth exemplary embodiment. Explanation is of an example in which the present invention is applied to a vehicle steering apparatus for a steer-by-wire system. Portions of the configuration similar to those of the first exemplary embodiment are allocated the same reference numeral and further explanation is omitted.

Figure 19:
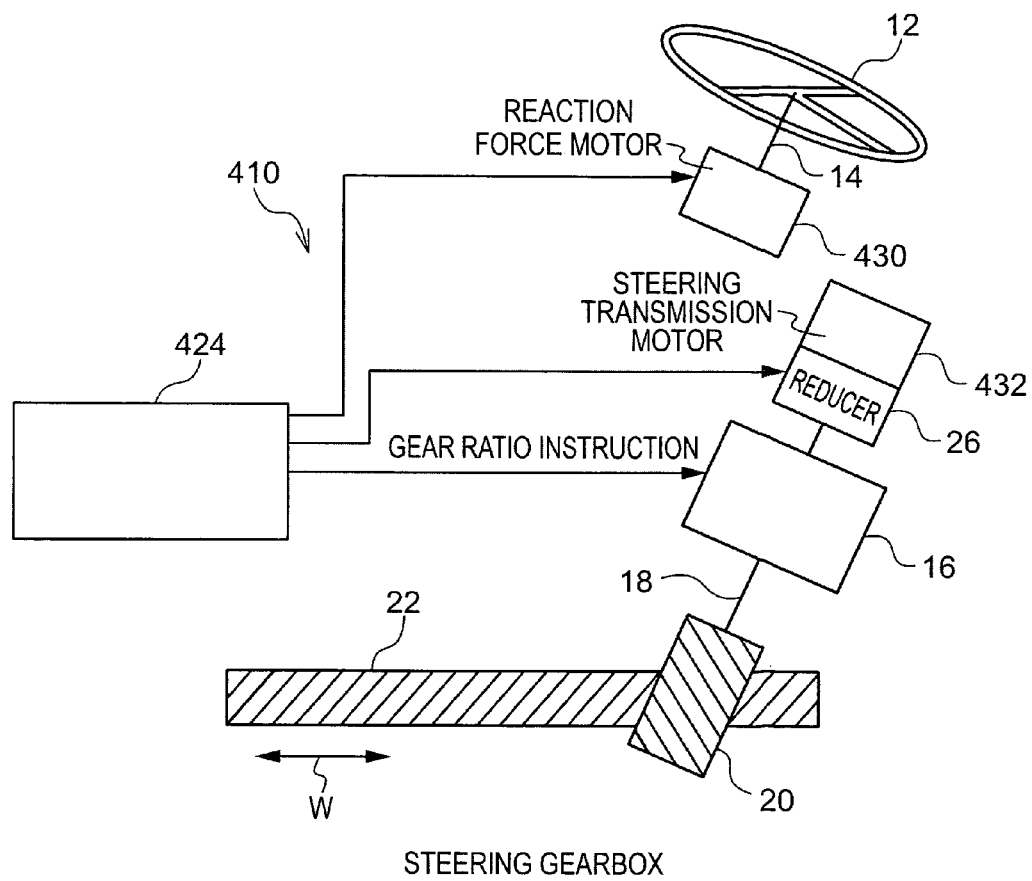
FIG. 19 is a schematic diagram illustrating a configuration of a vehicle steering apparatus according to a fourth exemplary embodiment of the present invention.

As shown in FIG. 19, a vehicle steering apparatus 410 of the fourth exemplary embodiment includes a steering wheel 12, a rotating shaft 14, a variable steering gear ratio mechanism 16, an output shaft 18, a pinion 20, a rack shaft 22, a computer 424 and a reducer 26. The vehicle steering apparatus 410 also includes: a reaction force motor 430 for simulating steering wheel torque by causing torque to act on the steering wheel 12 according to driver operation of the steering wheel 12; and a steering transmission motor 432 for transmitting torque output according to driver operation of the steering wheel 12 for changing the set angle of the steerable wheels through the reducer 26 to the pinion 20 so as to be output to the steerable wheels.

Similarly to in the first exemplary embodiment, the computer 424 controls driving of the reaction force motor 430 such that a target value for steering wheel torque set based on the second map is realized. The computer 424 controls driving of the steering transmission motor 432 to change the set angle of the steerable wheels according to the steering wheel angle of the steering wheel 12 detected by the steering wheel angle sensor 32.

Note that other parts of the configuration and operation of the vehicle steering apparatus according to the fourth exemplary embodiment are similar to those of the first exemplary embodiment and so further explanation is omitted thereof.

In the first exemplary embodiment to the fourth exemplary embodiment explanation has been given of examples in which a yaw angular velocity is employed as a physical turn amount, however there is no limitation thereto. Configuration may be made with lateral speed employed as a physical turn amount and the resistance-feeling configured to monotonically increase with increasing lateral speed.

Explanation has been given of examples in which a yaw angular velocity is computed based on sensor outputs from a vehicle speed sensor and a steering wheel angle sensor, however there is no limitation thereto. Configuration may be made employing a yaw angular velocity sensor to detect yaw angular velocity.

Explanation has been given of examples in which torque for steering is caused to act using torque from an electrically powered steering apparatus motor and from a reaction force motor. However other than the electrically powered steering apparatus motor or the reaction force motor, configuration may be made such that torque for steering is caused to act by employing another actuator such as a variable steering gear ratio system actuator.

Explanation has been given of examples in which the perceived amount of stiffness is defined as being proportional to the logarithm to the physical amount of stiffness, however there is no limitation thereto. The perceived amount of stiffness may be defined as substantially proportional to the logarithm of the physical amount of stiffness.

Explanation has also been given of examples in which a first map expressing relationships between the steering wheel angle, vehicle speed, and yaw angle velocity gain is employed for deriving a yaw angle velocity gain corresponding to the detected steering wheel angle and vehicle speed. However there is no limitation thereto. Configuration may be made such that target values of yaw angle velocity gain are computed from the detected steering wheel angle and vehicle speed according to a formula expressing a correspondence relationship between steering wheel angle, vehicle speed and yaw angle velocity gain. Configuration may also be made in which yaw angular velocity target values are computed from the detected steering wheel angle and vehicle speed according to a formula representing a correspondence relationship between steering wheel angle, vehicle speed and yaw angle velocity.

Explanation has been given of examples in which the second map representing yaw angular velocity and steering wheel torque is employed to derive a steering wheel torque corresponding to the acquired yaw angular velocity. There is however no limitation thereto and configuration may be made such that a steering wheel torque target value is computed from the acquired yaw angular velocity according to a formula expressing a correspondence relationship between yaw angular velocity and steering wheel torque.

Furthermore, while explanation has been given of an example in which steering of the front wheels is controlled there is no limitation thereto and configuration may be made such that the steering of the rear wheels is controlled. In such cases the rear wheel steering gear ratio may be computed to realize the yaw angle velocity gain target value or the yaw angular velocity target value according to a formula derived employing a relationship between the yaw angular velocity and the rear wheel actual steering angle. Configuration may also be made such that the steering of both the front wheels and the rear wheels is controlled. In such cases the front and rear wheel steering gear ratios may be computed to realize the yaw angle velocity gain target value or the yaw angular velocity target value according to a formula derived by employing relationships between the yaw angular velocity and both the front wheel actual steering angle and the rear wheel actual steering angle.

What is claimed is:

1. A steering apparatus for realizing a relationship between a steering wheel angle and a yaw angular velocity occurring in a vehicle, predetermined such that the direction as seen from the view point of a driver of a target destination point on a target course for vehicle travel at a predetermined time after a forward gaze and the direction as seen from the view point of the driver of a reference position on the steering wheel are corresponded with each other, wherein the steering apparatus comprises:
   a physical turn amount acquisition section that acquires a physical turn amount of a vehicle;
   a steering wheel angle detection section that detects the steering wheel angle existing due to driver steering;
   a target setting section that, based on a predetermined relationship between the physical turn amount and a resistance-feel level, sets a target value of steering wheel torque to correspond to the detected steering wheel angle and the acquired physical turn amount such that the resistance-feel level of the driver derived from a perceived amount of proportional change in steering wheel torque to a change in steering wheel angle and a perceived amount of the steering wheel torque monotonically increase with increase in physical turn amount; and
   a steering wheel torque controller that controls so as to realize the steering wheel torque target value set by the target setting section.

2. The steering apparatus of claim 1 wherein a relationship between the steering wheel angle and the yaw angular velocity is realized through a vehicle steering gear ratio.

3. The steering apparatus of claim 1 wherein the forward gaze time is a time from 2.5 seconds to 3.5 seconds.

4. The steering apparatus of claim 1 wherein the relationship between the steering wheel angle and the yaw angular velocity is determined so as to generate a yaw angular velocity proportional to a tangent to a relative angle between the steering wheel angle and a roll angle for generating in the vehicle.

5. The steering apparatus of claim 1 wherein the physical turn amount is taken as the yaw angular velocity or as a lateral acceleration.

6. The steering apparatus of claim 1 further comprising a lever for operating braking in the vehicle provided to a grip section of the steering wheel.

7. The steering apparatus of claim 1 further comprising:
   a vehicle speed detection section for detecting vehicle speed of the vehicle;
   a yaw angular velocity gain computation section for computing a yaw angular velocity gain based on the vehicle speed detected by the vehicle speed detection section, the steering wheel angle detected by the steering wheel angle detection section and a relationship between the steering wheel angle and the yaw angular velocity predetermined for each vehicle speed; and
   a gear ratio controller for controlling a steering gear ratio so as to realize the yaw angular velocity gain computed by the yaw angular velocity gain computation section.

8. The steering apparatus of claim 7 wherein the yaw angular velocity gain computation section computes the yaw angular velocity gain based on the relationship between the steering wheel angle and the yaw angular velocity gain, predetermined from the vehicle speed detected by the vehicle speed detection section, the steering wheel angle detected by the steering wheel angle detection section, and the relationship between the steering wheel angle and the yaw angular velocity predetermined for each vehicle speed.

9. The steering apparatus of claim 1 further comprising:
   a vehicle speed detection section for detecting the vehicle speed of a vehicle;
   a yaw angular velocity computation section for computing a target yaw angular velocity based on a vehicle speed detected by the vehicle speed detection section, the steering wheel angle detected by the steering wheel angle detection section, and a predetermined relationship between the steering wheel angle and the yaw angular velocity for each vehicle speed; and
   a gear ratio controller for controlling a steering gear ratio so as to realize the target yaw angular velocity computed by the yaw angular velocity gain computation section.

10. The steering apparatus of claim 1 wherein the target setting section sets as a target value the steering wheel torque corresponding to the detected steering wheel angle and the acquired physical turn amount acquired based on a predetermined relationship between the physical turn amount and the resistance-feel level and based on a correspondence relationship between the physical turn amount, the steering wheel angle and the steering wheel torque.

11. The steering apparatus of claim 1 wherein the steering wheel torque controller controls such that a torque assistance level according to the steering wheel torque target value set by the target setting section or the target value of the steering wheel torque is generated.

12. A steering method for realizing a relationship between a steering wheel angle and a yaw angular velocity occurring in a vehicle, predetermined such that the direction as seen from the view point of a driver of a target destination point on a target course for vehicle travel at a predetermined time after a forward gaze and the direction as seen from the view point of the driver of a reference position on the steering wheel are corresponded with each other, wherein the steering method comprises:
   acquiring a physical turn amount of a vehicle;
   detecting the steering wheel angle existing due to driver steering;
   setting, based on a predetermined relationship between the physical turn amount and a resistance-feel level, a target value of steering wheel torque to correspond to the detected steering wheel angle and the acquired physical turn amount such that the resistance-feel level of the driver derived based on a perceived amount of proportional change in steering wheel torque to a change in steering wheel angle and a perceived amount of the steering wheel torque monotonically increase with increase in physical turn amount; and
   controlling so as to realize the set steering wheel torque target value, wherein
      the steps of acquiring, detecting, setting, and controlling are performed by a processor.

13. The steering method of claim 12 further comprising:
   detecting vehicle speed of the vehicle;
   computing a yaw angular velocity gain based on the detected vehicle speed, the detected steering wheel angle and a relationship between the steering wheel angle and the yaw angular velocity predetermined for each vehicle speed; and
   controlling a steering gear ratio so as to realize the computed yaw angular velocity gain, wherein
      the steps of detecting, computing, and controlling are performed by the processor.

14. The steering method of claim 12 further comprising:
   detecting vehicle speed of the vehicle;
   computing a target yaw angular velocity based on the detected vehicle speed, the detected steering wheel angle and a relationship between the steering wheel angle and the yaw angular velocity predetermined for each vehicle speed; and
   controlling a steering gear ratio so as to realize the computed target yaw angular velocity, wherein
      the steps of detecting, computing, and controlling are performed by the processor.

15. A non-transitory computer readable storage medium stored with a program for causing a computer to execute steering control for realizing a relationship between a steering wheel angle and a yaw angular velocity occurring in a vehicle, predetermined such that the direction as seen from the view point of a driver of a target destination point on a target course for vehicle travel at a predetermined time after a forward gaze and the direction as seen from the view point of the driver of a reference position on the steering wheel are corresponded with each other, wherein the steering control comprises:
   acquiring a physical turn amount of a vehicle;
   detecting the steering wheel angle existing due to driver steering;
   setting, based on a predetermined relationship between the physical turn amount and a resistance-feel level, a target value of steering wheel torque to correspond to the detected steering wheel angle and the acquired physical turn amount such that the resistance-feel level of the driver derived based on a perceived amount of proportional change in steering wheel torque to a change in steering wheel angle and a perceived amount of the steering wheel torque monotonically increase with increase in physical turn amount; and
   controlling so as to realize the set steering wheel torque target value.

16. The non-transitory computer readable storage medium of claim 15 wherein the steering control further comprises:
   detecting vehicle speed of the vehicle;
   computing a yaw angular velocity gain based on the detected vehicle speed, the detected steering wheel angle and a relationship between the steering wheel angle and the yaw angular velocity predetermined for each vehicle speed; and
   controlling a steering gear ratio so as to realize the computed yaw angular velocity gain.

17. The non-transitory computer readable storage medium of claim 15 further comprising:
   detecting vehicle speed of the vehicle;
   computing a target yaw angular velocity based on the detected vehicle speed, the detected steering wheel angle and a relationship between the steering wheel angle and the yaw angular velocity predetermined for each vehicle speed; and
   controlling a steering gear ratio so as to realize the computed target yaw angular velocity.

* * * * *